US011556235B2

(12) United States Patent
Wei et al.

(10) Patent No.: US 11,556,235 B2
(45) **Date of Patent: *Jan. 17, 2023**

(54) INTERACTING WITH NONCONFORMING APPLICATIONS IN A WINDOWING ENVIRONMENT

(71) Applicant: Microsoft Technology Licensing, LLC, Redmond, WA (US)

(72) Inventors: Yaou Wei, Redmond, WA (US); Christopher E. Swan, Bellevue, WA (US); Alex Snitkovskiy, Renton, WA (US); Tsz Yan Wong, Seattle, WA (US); Hirofumi Yamamoto, Bellevue, WA (US); Steven J. Tricanowicz, Seattle, WA (US); Brian D. Beck, Woodinville, WA (US); Miron Vranjes, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/516,003

(22) Filed: Nov. 1, 2021

(65) Prior Publication Data

US 2022/0147235 A1 May 12, 2022

Related U.S. Application Data

(63) Continuation of application No. 16/225,259, filed on Dec. 19, 2018, now Pat. No. 11,194,459, which is a (Continued)

(51) Int. Cl.

| | |
|---|---|
| ***G06F 3/0481*** | (2022.01) |
| ***G06F 3/04847*** | (2022.01) |
| ***G06F 9/451*** | (2018.01) |

(52) U.S. Cl.

CPC ........ *G06F 3/04847* (2013.01); *G06F 3/0481* (2013.01); *G06F 9/451* (2018.02); *G06F 9/452* (2018.02); *G06F 2203/04803* (2013.01)

(58) Field of Classification Search

CPC ...... G06F 3/04847; G06F 9/452; G06F 9/451; G06F 3/0481; G06F 2203/04803

See application file for complete search history.

(56) References Cited

U.S. PATENT DOCUMENTS

| | | | | |
|---|---|---|---|---|
| 5,473,745 A * | 12/1995 | Berry | G06F 3/0481 | 715/788 |
| 6,212,541 B1 * | 4/2001 | McAuliffe | G06F 3/167 | 718/107 |
| 2007/0016867 A1 * | 1/2007 | Nickell | G06F 9/451 | 715/730 |

OTHER PUBLICATIONS

ModernMix, Avram Piltch Mar. 7, 2013, laptopmag.com https:/Awww.laptopmag.com/articles/modernmix-fixes-windows-8-runs-all-apps-on-the-desktop; 5pgs (Year: 2013) (Year: 2013).*

(Continued)

*Primary Examiner* — Andrey Belousov

(74) *Attorney, Agent, or Firm* — Rainier Patents, P.S.

(57) ABSTRACT

A computer-implemented technique is described herein for efficiently and reliably interacting with a nonconforming application component in a windowing environment. The nonconforming application component corresponds to a type of application (such as, but not limited to, an immersive-type full-screen application) that was not originally designed for presentation of application content in a windowing environment, or was not originally designed for presentation of application content in a windowing environment of a certain type. In some implementations, the computer-implemented technique generates a composite window by: creating a system-owned frame; receiving an application-owned window; and creating the composite window by combining the frame and the application-owned (Continued)

window. The technique can thereafter control the composite window by performing operations on the composite window via its system-owned frame.

20 Claims, 19 Drawing Sheets

Related U.S. Application Data continuation of application No. 14/798,372, filed on Jul. 13, 2015, now Pat. No. 10,198,167.

(56) References Cited

OTHER PUBLICATIONS

Sibsankar Haldar, Operating Systems, Dorling Kindersley, pp. 15 (Year: 2010) (Year: 2010).*
Simon Richard J. Simon, Sams Publishing MicrosoftWindows 2000 API SuperBible, 10 pgs (Year: 2000) (Year: 2000).*

* cited by examiner

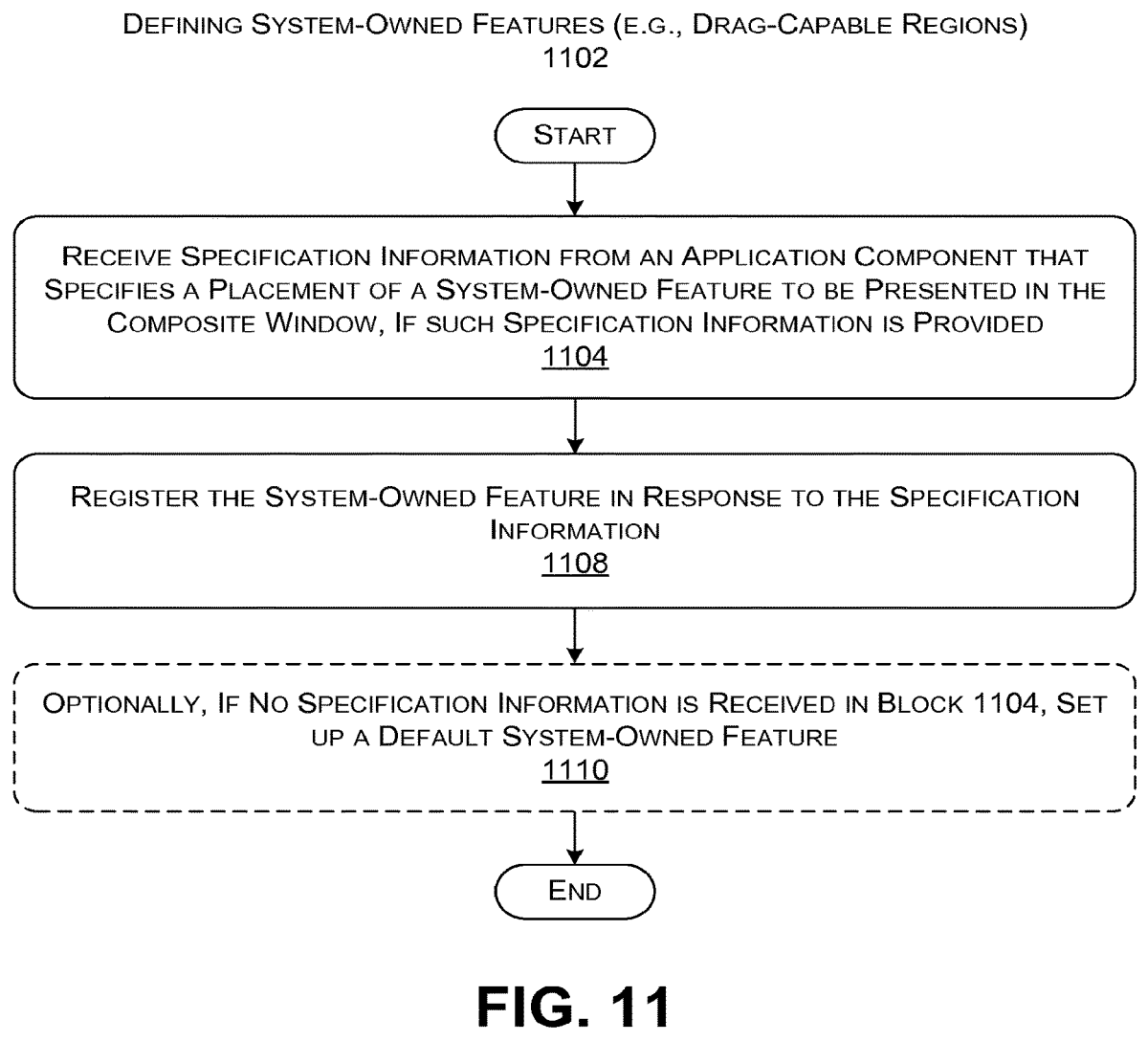

DEFINING SYSTEM-OWNED FEATURES (E.G., DRAG-CAPABLE REGIONS)
1102

START

RECEIVE SPECIFICATION INFORMATION FROM AN APPLICATION COMPONENT THAT SPECIFIES A PLACEMENT OF A SYSTEM-OWNED FEATURE TO BE PRESENTED IN THE COMPOSITE WINDOW, IF SUCH SPECIFICATION INFORMATION IS PROVIDED
1104

REGISTER THE SYSTEM-OWNED FEATURE IN RESPONSE TO THE SPECIFICATION INFORMATION
1108

OPTIONALLY, IF NO SPECIFICATION INFORMATION IS RECEIVED IN BLOCK 1104, SET UP A DEFAULT SYSTEM-OWNED FEATURE
1110

END

FIG. 11

INTERACTING WITH NONCONFORMING APPLICATIONS IN A WINDOWING ENVIRONMENT

BACKGROUND

An application presentation paradigm governs the manner by which users interact with applications via a graphical user interface presentation. Traditionally, the computing industry has allowed users to interact with applications in a desktop windowing environment. In that setting, users interact with applications via respective application windows. The application windows represent application resources that users can manipulate in a traditional manner, e.g., by moving, resizing and closing the windows. Any two or more windows may overlap at any given time.

More recently, the computing industry has allowed users to interact with applications in non-windowing environments. One such non-windowing environment is that used to present immersive-type full-screen applications. Here, a computing device displays an application's content such that it effectively fills an entire display space of a graphical user interface presentation. Such a presentation strategy is particularly apt for use by handheld computing devices having relatively small display screens, e.g., because it may not be readily feasible to present plural movable windows on these kinds of display screens. Generally, as the term is used herein, a "nonconforming application" refers to any application that was not originally designed for the presentation of application content in a windowing environment, or was not originally designed for the presentation of application content in a windowing environment of a certain type (although it may have been designed for presentation of application content in a windowing environment of another type).

While many users have welcomed the introduction of new presentation paradigms, some users may be confused by the new presentation paradigms and/or may otherwise prefer the use of more traditional windowing paradigms in certain circumstances. Nonconforming applications do not accommodate such "retro" preferences, however, as they were not created for use in a windowing environment.

SUMMARY

A computer-implemented technique is described herein for allowing users to interact with a nonconforming application component in a windowing environment. The nonconforming application component corresponds to a type of application (such as, but not limited to, an immersive-type full-screen application) that was not originally designed for presentation of application content in any windowing environment, or was not originally designed for presentation of application content in a windowing environment of a certain type.

In some implementations, the computer-implemented technique generates a composite window by: creating a frame; receiving an application window from an application component; creating the composite window by combining the frame and the application window; and presenting the composite window on a graphical user interface presentation provided by one or more presentation devices. The frame represents a system-owned part of the composite window (e.g., as provided by an operating system), while the application window represents an application-owned part of the composite window.

The computer-implemented technique can thereafter control the composite window by performing operations on the composite window via its system-owned frame. For instance, the operations may entail moving the composite window, resizing the composite window, suspending the composite window, terminating the composite window, etc.

In some implementations, the computer-implemented technique also entails generating the composite window in a manner that conforms to at least one application preference specified by the nonconforming application component. For example, one type of application preference may specify the permitted size (or sizes) of the composite window.

In some implementations, the computer-implemented technique also provides a way by which the nonconforming application can specify a domain associated with at least one system-owned feature of the composite window, such as a drag-capable region of the composite window. After the system-owned featured is thus defined, the operating system reliably controls a user's interaction with the system-owned feature. On the other hand, the nonconforming application component controls the user's interaction with other application-owned features of the composite window.

The above-summarized computer-implemented technique has one or more useful effects. First, the technique improves the efficiency by which a user interacts with a nonconforming application component by allowing the user to interact with the application component via a paradigm with which the user is likely to be already familiar, despite the native design of the nonconforming application component; at the same time, the technique respects application preferences associated with the nonconforming application component. Second, the technique leverages the use of the system-owned frame to ensure that the composite window will be responsive to operations performed on the composite window (such as requests to move, resize, suspend, terminate, etc. the composite window), despite possible anomalies in the execution of the underlying application component. Third, the technique efficiently conserves system resources through the manner in which it suspends a composite window. Fourth, the technique allows developers to create nonconforming application components that can be presented using many different presentation paradigms and using many different presentation devices without creating custom application code for these different respective presentation contexts. The above-identified effects are cited by way of example, not limitation; the technique may confer additional useful effects not identified above.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 serves as a vehicle for explaining the operation of a hit-testing component, which is a part of the input component of FIG. 4.

FIG. 11 shows a process that describes one manner by which a system feature definition component (SFDC) of FIG. 4 can be used to set up a system-owned feature, based on specification information provided by a nonconforming application component.

Figure 1:
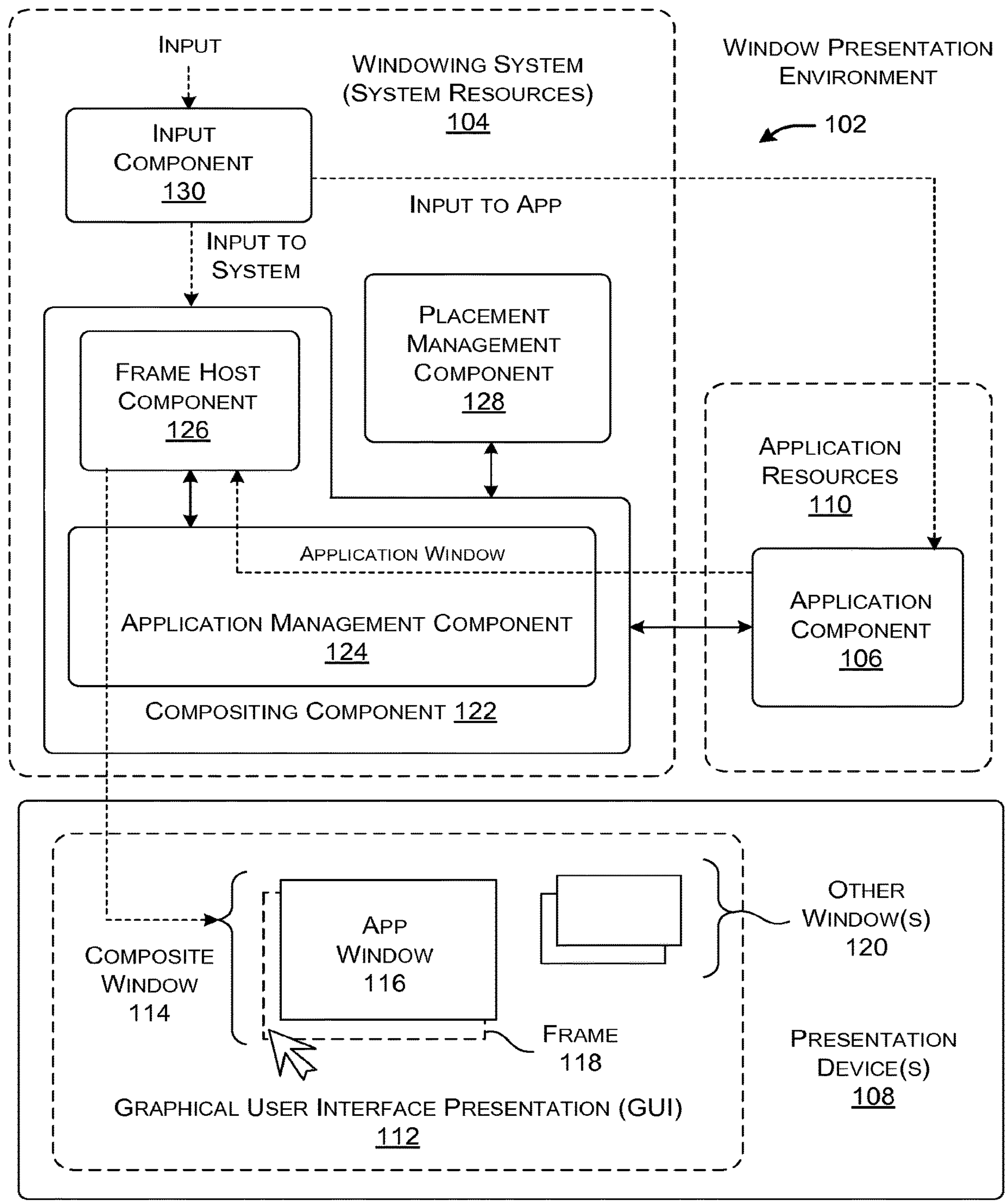
FIG. 1 shows an overview of a window presentation environment in which nonconforming application components present their application content in a windowing environment.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a window presentation environment that is used to present and interact with application content provided by nonconforming application components in a windowing environment. Section B sets forth illustrative methods and associated examples which explain the operation of the window presentation environment of Section A. Section C describes illustrative computing functionality that can be used to implement any aspect of the features described in Sections A and B.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

Any of the storage resources described herein, or any combination of the storage resources, may be regarded as a computer readable medium. In many cases, a computer readable medium represents some form of physical and tangible entity. The term computer readable medium also encompasses propagated signals, e.g., transmitted or received via a physical conduit and/or air or other wireless medium, etc. However, the specific terms "computer readable storage medium" and "computer readable medium device" expressly exclude propagated signals per se, while including all other forms of computer readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Window Presentation Environment

A.1. Overview

FIG. 1 shows a window presentation environment 102 for presenting and interacting with the application content of nonconforming application components in a windowing environment. As mentioned above, in one context, a nonconforming application component refers to any type of application that was not originally designed for presentation of application content in a windowing environment. One type of nonconforming application component corresponds to an immersive-type full-screen application. A developer creates this kind of application based on the premise that its application content is to fill an entire display space associated with a graphical user interface presentation. In some cases, although not necessarily all cases, the nonconforming application component may also be designed to operate in a security-related framework that is atypical with respect to traditional windowing environments. For example, a nonconforming application component may be designed such that it cannot access certain system resources of the computing device on which it runs—a restriction that is not found in conventional windowing environments.

In other cases, a nonconforming application component corresponds to an application component that was designed for presentation of application content in a windowing environment of a first type, whereas the window presentation environment 102 entails presenting application content in a windowing environment of a second type. More generally, the window presentation environment 102 is general purpose in nature; it can be applied to many types of nonconforming applications (as well as conforming applications).

To simplify the explanation, each nonconforming application component will be henceforth referred as simply an application component. Further note that, as the term is used herein, a window refers to a graphical control element by which a user may interact with an application. In the illustrated examples, a window takes the form of a two-dimensional panel having a quadrilateral (e.g., rectangular) shape. But a window may more generally refer to any control element having any number of dimensions and/or any shape.

The window presentation environment 102 includes three main components, including a windowing system 104, at least one application component 106, and one or more presentation devices 108 (referred to in the singular below to facilitate description). The windowing system 104 is implemented by an operating system of one or more computing devices (to be described in Section C). The application component 106 represents application resources 110 that run on the computer device(s), and which provide nonconforming application content. The presentation device 108 presents windows provided by the windowing system 104 in a graphical user interface presentation 112.

More specifically, the windowing system 104 provides what are referred to herein as composite windows, such as an illustrative composite window 114. Each composite window is said to be composite because it is made up of an application window which is presented within a frame. For example, the composite window 114 is made up of an application window 116 that is presented within a frame 118. (Note that the figures show a visual depiction of the frame 118 to facilitate explanation, although, in actual practice, the frame 118 may not have a visible counterpart on the graphical user interface presentation 112—although it could in other implementations.) The application window 116 represents an application-owned and application-controlled resource that is provided by the application component 106. The frame 118 represents a system-owned and system-controlled resource that is provided by the windowing system 104 (which, in turn, is provided by the operating system).

FIG. 1 also indicates that the windowing system 104 can present one or more other windows 120 in the graphical user interface presentation 112. One or more of these other windows 120 may represent composite windows of the same type as the composite window 114. Alternatively, or in addition, one or more of these other windows 120 may represent windows produced by other types of application components, such as conforming application components that were designed to present windows within a windowing environment.

The operation of the windowing system 104 will be primarily described below with respect to the creation and manipulation of the representative composite window 114. Note that the windowing system 104 can perform the same operations with respect to any number of other composite windows, not specifically shown in FIG. 1. Further note that the operation of the windowing system 104 will be described with respect to a type of application component that generates a single window through which a user interacts with the application component. But the principles set forth below also extend to the type of application component that generates two or more windows.

The windowing system 104 creates the composite window 114 by effectively pasting the application window 116 into the frame 118. From a high-level perspective, the frame 118 represents the entity by which the application window 116 is "known" to the windowing system 104. Further, the frame 118 represents the vehicle or mechanism by which the windowing system 104 controls the application window 116, such as by moving, resizing, suspending, terminating, etc. the application window 116. Effectively, then, the windowing system 104 encapsulates the output of a nonconforming application component in a conforming system-owned window shell.

According to one effect, by virtue of the fact that the composite window 114 includes a system-owned frame 118, the windowing system 104 can reliably control the composite window 114, even when the application component 106 itself is not responsive. For example, assume that a user issues an instruction to resize the composite window 114, e.g., by dragging out a corner of the composite window 114. As will be described in greater detail below, the windowing system 104 will use its system resources to perform this movement, even though the application component 106 itself may be non-responsive (e.g., because its execution may have "hung" for any reason).

The windowing system 104 includes (or may be conceptualized as including) plural components that perform different respective functions. For instance, in one implementation, the windowing system 104 includes a compositing component 122 for creating the composite window 114 and for subsequently controlling the composite window 114.

In one implementation, the compositing component 122 itself includes an application management component 124 and a frame host component 126. The application management component 124 serves as a main module for managing the layout of the graphical user interface presentation 112, including its composite window(s) and "regular" window(s), if any. In doing so, the application management component 124 interacts with the application component 106 (from which it receives the application window 116) and the frame host component 126. The frame host component 126 performs various functions that specifically pertain to the frame 118, such as by creating the frame 118, and then creating the composite window 114 by "pasting" the application window 116 into the frame 118. The frame host component 126 also processes events directed to the frame 118 once it has been created. However, the above-summarized allocation of functions within the compositing component 122 represents just one implementation; in other cases, the compositing component 122 may include other types of components compared to those described above, and/or may allocate functions amongst its components in a different manner compared to that described above.

The windowing system 104 further includes a placement management component 128. The placement management component 128 determines, when requested to do so by the compositing component 122, a placement of the composite window 114 within the graphical user interface presentation 112. Here, the term "placement" defines the way in which the composite window 114 is placed within the graphical user interface presentation 112. The placement, expressed by placement information, may describe one or more placement-related characteristics, such as the composite window's position, its size, and/or its state. The state, in turn, may describe a presentation mode associated with the composite window 114, such as whether the composite window 114 is a free-floating window within the graphical user interface presentation 112, or a "snapped" window that is snapped to one or more edges of the graphical user interface presentation 112, or a maximized window, etc. A window is snapped to an edge when one of its borders directly abuts that edge and is affixed to that edge. A window is maximized when it fills an entire space of an available workspace, or is otherwise shown in its largest permitted size.

As will be described below in greater detail, the placement management component 128 determines the placement of the composite window 114 based on at least persistence information and application preference information. The persistence information describes a previous placement of the composite window 114 on the graphical user interface presentation 112, corresponding to the last time that the application component 106 was invoked (if, in fact, such persistence information exists). The application preference information represents at least one presentation-related preference associated with the application component 106 that defines the manner in which its window(s) are expected to be presented to its users, with respect to at least one aspect of the presentation of the window(s). For example, an application preference may define a minimum permitted size of an application component's window(s).

An input component 130 receives input information, corresponding to an input event, that is directed to the composite window 114. In some cases, the input information may originate from a user's interaction with the composite window 114 via the graphical user interface presentation 112, e.g., using a mouse device input mechanism, a touch-sensitive input mechanism, a key input mechanism, etc. For instance, the input information may be produced when the user attempts to drag the composite window 114 to a new location within the graphical user interface presentation 112. Alternatively, or in addition, the input information may be produced by another application component. For instance, the input event may represent an instruction by another application component to minimize or terminate the composite window 114 (associated with the application component 106) for any reason. Alternatively, or in addition, the input information may be produced by the windowing system 104 itself. For instance, the input event may represent an instruction by the windowing system 104 to terminate the composite window 114 based on any system condition.

As will be described below in greater detail, the input component 130 can operate by discriminating whether the input event is directed to a system-owned feature of the composite window 114 or an application-owned feature of the composite window 114. In the former case, the input component 130 can route the corresponding input information to an appropriate system component, such as the compositing component 122. In the latter case, the input component 130 can direct the input information to the application component 106.

Figure 2:
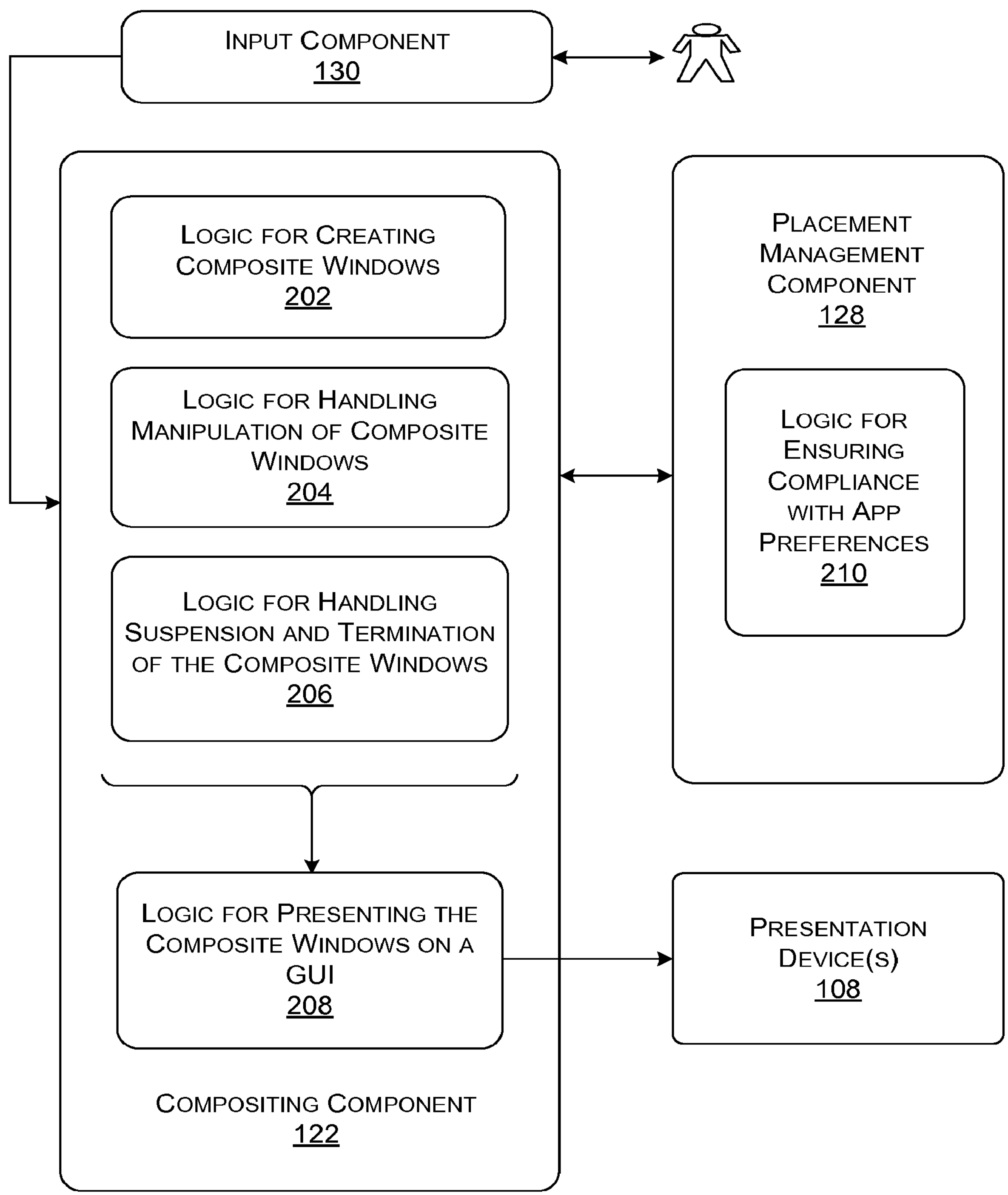
FIG. 2 shows a logical representation of certain features of the window presentation environment of FIG. 1.

FIG. 2 shows a logical representation of the window presentation environment 102 of FIG. 1. As indicated there, the compositing component 122 performs at least four main functions using respective logic components. First, the compositing component 122 includes logic 202 for creating composite windows. Second, the compositing component 122 includes logic 204 for handling manipulation of the composite windows (such as dragging and resizing the composite windows). Third, the compositing component 122 includes logic 206 for handling the suspension and resumption of the composite windows, and for handling termination (shut-down) of the composite windows. Fourth, the compositing component 122 includes logic 208 for presenting the composite windows on the graphical user interface presentation 112.

The placement management component 128 also performs various main functions. As one main function, the placement management component 128 includes logic (not shown) for determining the placement of composite windows on the graphical user interface presentation 112. To perform this task, the placement management component 128 relies on logic 210 for ensuring compliance with application preferences.

A.2. Example of a Composite Window

Figure 3:
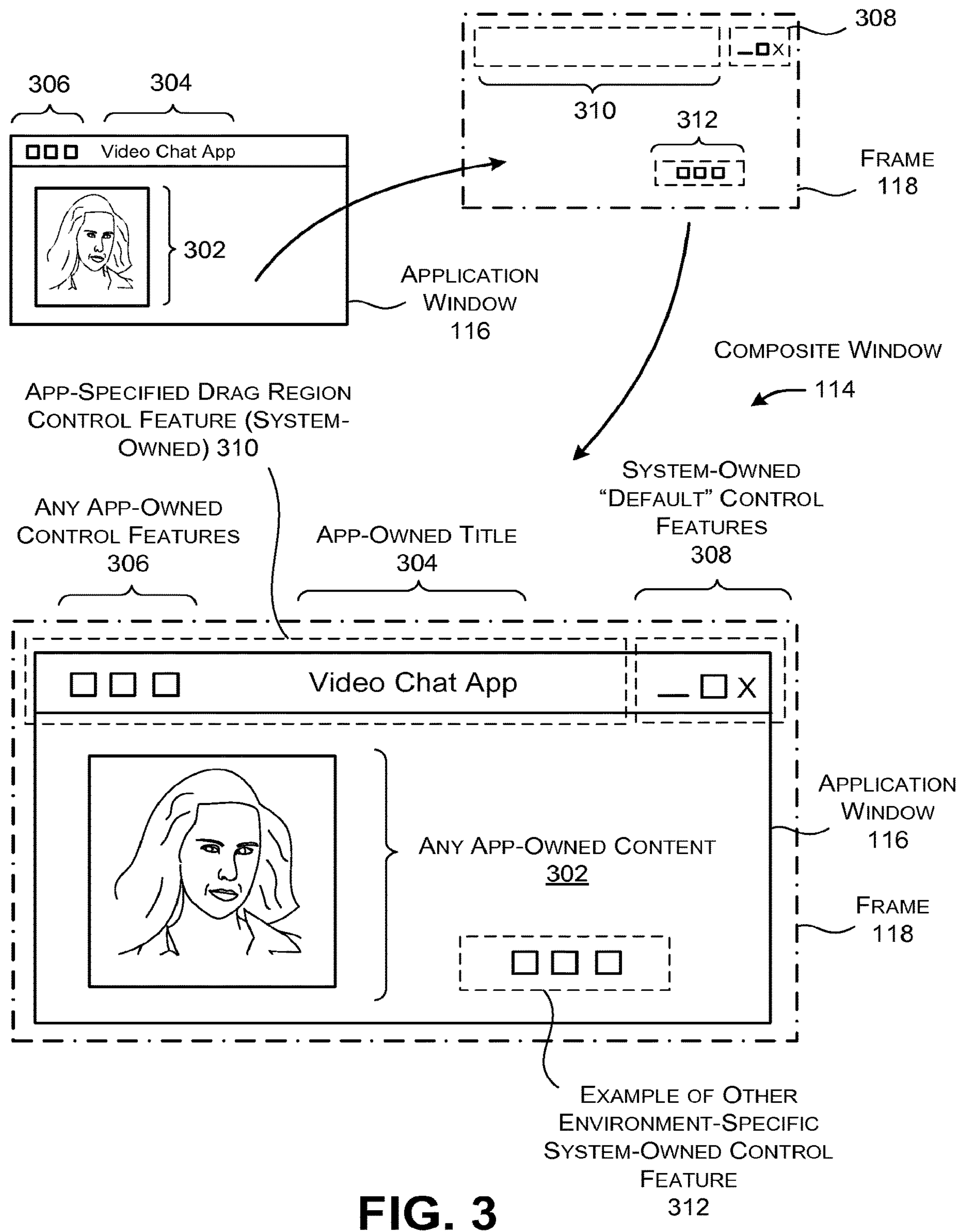
FIG. 3 shows an example of a composite window produced by the window presentation environment of FIG. 1.

FIG. 3 shows an example of the composite window 114 produced by the window presentation environment 102 of FIG. 1. The composite window 114 includes the application window 116 produced by the application component 106 and the frame 118 produced by the windowing system 104. More specifically, FIG. 2 separately depicts the application window 116 and the frame 118 in the top part of the figure, and depicts the composite window 114 in the bottom part of the figure, in which the application window 116 is combined with the frame 118.

In one implementation, the application component 106 is free to draw its application content over an entire surface of the application window 116 (with possible minor environment-specific exceptions to be described below). In other words, in traditional windowing technology, a window includes a title bar region and an application-related region. Traditionally, an application component displays its application content in just the application-related region. In the case of FIG. 2, however, the application component 106 is free to draw its content in any region, including the region that has been traditionally regarded as the title bar region.

In the present (but merely illustrative) case, the application component 106 performs a video conferencing function. As such, the application window 116 presents video-related application content 302. The application window 116 can also display an application-owned title 304 and application-owned control features 306 in the title bar region. The application-owned control features 306 can invoke any application-specific functions. For example, one such control feature may adjust the zoom level of a camera device used to conduct a video chat session.

The frame 118 may include (or is otherwise associated with) one or more system-owned control features that may appear anywhere within the frame 118. For example, the frame 118 can include default-type control features 308 in its title bar region. These control features allow a user to minimize, maximize and close the application window 116 (via operations performed on the frame 118). In addition, the frame 118 may be include (or may be otherwise be associated with) one or more supplemental control features (310, 312). The supplemental control features (310, 312) can perform any environment-specific functions and may appear anywhere within the frame 118.

For example, the illustrative control feature 310 is associated with the title bar region of the composite window 114 and specifies a drag-capable control zone. In operation, a user may drag the composite window 114 by executing a drag gesture that is directed to the drag-capable control zone within the composite window 114. On the other hand, the illustrative control feature 312 appears within the body of composite window 114 and performs any application-specific (but system-owned) operation. For example, the control feature 312 may correspond to a purchase button in an online shopping application or the like—an operation to which heightened security may apply. Other possible system-owned features (not shown) can include a control feature that allows a user to resize the composite window 114, a control feature that allows a user to enter secure password information, etc.

In one implementation, when the compositing component 122 resizes the composite window 114, it operates to proportionally resize all of its constituent features, or at least some of its constituent features. For example, when the compositing component 122 reduces the size of the composite window 114, it will proportionally reduce the size of the drag-capable zone defined by the system-owned control feature 310.

In operation, the windowing system 104 handles whatever process is invoked by a system-owned control feature, while the application component 106 controls whatever process is invoked by an application-owned control feature. Hence, in the representative example of FIG. 2, the windowing system 104 controls the processes invoked when the user activates the default-type control features 308, the drag-related control feature 310, or the purchase-related control feature 312. On the other hand, the application component 106 handles all other input events by the user that are directed to the application content. For example, the application component 106 can handle the user's activation of the application-owned control features 306.

The system-related control features (308, 310, 312) shown in FIG. 3 can be defined and generated in any manner. For example, the windowing system 104 may include the title bar default-type control features 308 in every frame that it generates as hard-coded default features. In contrast, the windowing system 104 may register the supplemental control features (310, 312) upon being requested to do so by the application component 106. The next subsection clarifies one way in which the windowing system 104 registers the existence of the supplemental control features (310, 312).

A.3. System Feature Definition Component and Input Component

Figure 4:
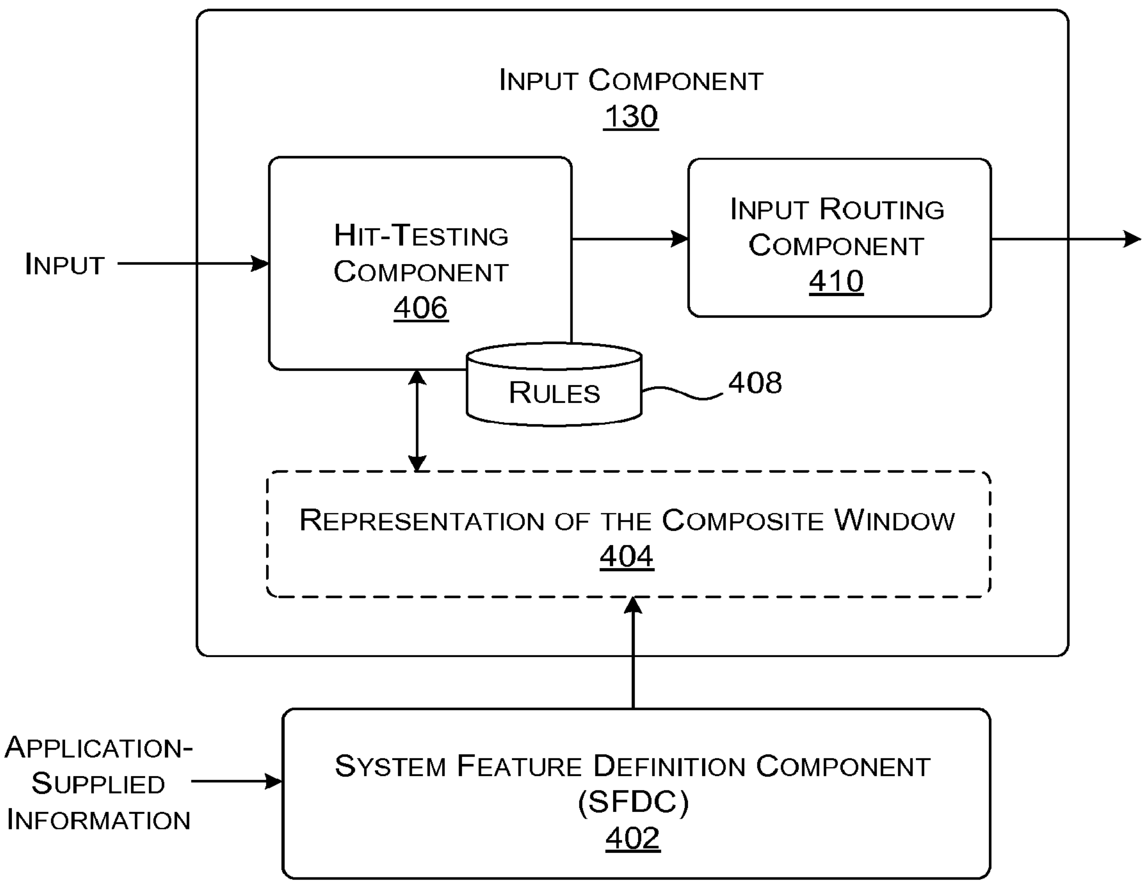
FIG. 4 shows one implementation of an input component, which is a part of the window presentation environment of FIG. 1.

Advancing FIG. 4, this figure shows one implementation of the input component 130 that was introduced in FIG. 1. The input component 130 processes an input event and forwards resultant input information to either the windowing system 104 or the application component 106, depending on the feature to which the input event is directed. FIG. 4 also shows a system feature definition component (SFDC) 402. The SFDC 402 is likewise implemented by the windowing system 104, and may represent a standalone component of the windowing system 104 or a module subsumed in the functionality provided by any other component of the windowing system 104.

Starting with the SFDC 402, this component registers the existence of the type of the system-owned and application-defined control features (310, 312) described above. In operation, the application component 106 sends specification information that defines a system-owned control feature. The SFDC 402 receives the specification information, and, in response, registers the existence of the system-owned control feature that is defined by the specification information.

The application component 106 can send the specification information at any juncture of its operation. For example, the application component 106 can send the specification information every time it is launched, or just the first time it is launched (upon which it is stored by the SFDC 402). In another case, the application component 106 can dynamically modify the specification information during its operation, and can send the specification information at any juncture(s) during its operation. In still another scenario, some other component (besides the application component 106) can send the specification information. For example, a network-accessible reference source can provide the specification information for one or more application components at any time.

The specification information can define a system-owned feature in any way. For example, the specification information can spatially define the scope of a control region associated with the system-owned feature. For example, for the system-owned control feature 310 of FIG. 3, the specification information defines the dimensions of a rectangle associated with a drag-capable region, and the position of the drag-capable region within the composite window 114.

In addition, the specification information can define the nature of the control operation that is associated with a system-owned control feature. For example, for the system-owned control feature 310 of FIG. 3, the specification information can specify that the zone that is defined pertains to a drag-capable region.

In addition, the specification information can define the input method(s) by which a user may engage the control feature being defined. For example, the specification information for a first system-owned control feature can indicate that the first system-owned control feature is capable of being invoked by mouse device clicks, while the specification information for a second system-owned control feature can indicate that the second system-owned control feature is capable of being invoked by touch-sensitive interface interaction, and so on. In some cases, two (or more) control features that are associated with different input methods may perform the same function, and may be associated with at least partially overlapping zones within the composite window 114. For example, two (or more) control features may allow a user to drag the composite window 114 via different respective input methods. The drag-capable zones associated with these different control features may (or may not) overlap, but, if they overlap, they need not wholly overlap; for instance, it may be appropriate to include a larger drag-capable zone for a first input method compared to a drag-capable zone associated with a second input method, to thereby most effectively complement the intrinsic natures of the first and second input methods.

In addition, the specification information can define a rank of a hit-testing area associated with a system-owned feature. The meaning of such "rank" will be clarified shortly below.

The input component 130 stores a representation 404 of the composite window 114, including of its constituent parts. Further, the representation 404 stores an indication of whether each part of the composite window 114 is system-owned, meaning that is controlled by the windowing system 104, or application-owned, meaning that it is controlled by the application component 106. Further, the representation 404 also stores the position of each part of the composite window 114 within a visual display tree. The position of a given part in the visual display tree defines the rank of the given part with respect to any other part(s) (if any) which may spatially overlap the given part within the composite window 114. The position of a given part in the visual display tree may be specified in any manner, such as by the windowing system 104 (e.g., as a default-type system definition), or by the application component 106, etc.

The ranks of two or more overlapping parts govern the input component's interpretation of a user's input event that is directed to an area of the graphical user interface presentation 112 that is associated with those parts. For example, consider the representation of the composite widow 114 shown in FIG. 5. The composite window 114 is associated with a visual display tree that defines three levels of features ($z_1$, $z_2$, and $z_3$), although, more generally, a composite window can be composed of any number of levels. The level $z_1$ defines parts of the composite window 114 that have priority over the parts in levels $z_2$ and $z_3$. The level $z_2$ defines parts of the composite window 114 that have priority over the parts in level $z_3$. In this merely illustrated case, the application-owned control features 306 and the default-type system-owned control features 308 have the highest priority level in the visual display tree. The system-owned supplemental control features (310, 312) have the next highest priority level. The remaining application-owned aspects of the composite window 114 have the lowest priority level. Note that this allocation of priority levels to features is merely illustrative; other implementations can adopt other allocations of features to priority levels.

Figure 5:
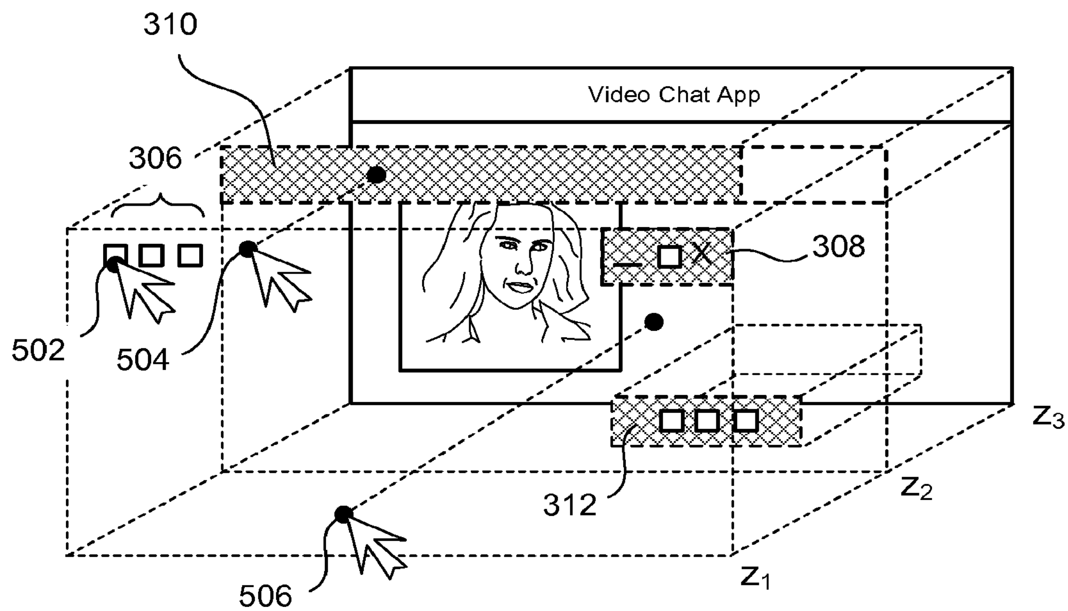
FIG. 5 shows different features of a composite window having different respective positions within a visual display tree.

Referring now to both FIGS. 4 and 5, a hit-testing component 406 of the input component 130 interprets a user's input action based on the representation 404 of the composite window 114, including its associated visual display tree. For example, assume that the user performs an input action by moving a cursor to a position 502. The position 502 is located "over" the application-owned control features 306 in level $z_1$. The application-owned control features 306, in turn, are layered on top of the system-owned control feature 310 (associated with the drag-capable region) in level $z_2$. The system-owned control feature 310, in turn, is layered on top of the base application content in level $z_3$. But since the application-owned control feature 310 has the highest priority within the visual display tree, the hit-testing component 406 will interpret the user's input as directed to the application-owned control features 306, and not the underlying system-owned control feature 310 or the base-level application-owned content.

Next, consider the case in which the user's input action is provided at position 504. The system-owned control feature 310 is the highest priority part that lies beneath the position 504, so the hit-testing component 406 will interpret the user's action as being directed to this control feature 310. Next, consider the case in which the user's input action is provided at a position 506. The base application content is the highest priority part that lies beneath the position 506, so the hit-testing component 406 will interpret the user's action as being directed to the application content.

More generally, the hit-testing component 406 operates by metaphorically projecting an orthogonal line from an input position through the features in the various layers of the visual display tree which lie beneath the input position. That projection operation defines a set of one or more potential features to which the input action may be directed. The hit-testing component 406 chooses the feature within the set having the highest priority level within the visual display tree. The hit-testing component 406 can also rely on application-specific and/or system-specific rules provided in a data store 408 in interpreting a user's input action with respect to the visual display tree.

In some implementations, the window presentation environment 102 operates under the premise that the application developer is expected to design the application component 106 such that it includes certain system-owed features, such as the system-owned control feature 310 that controls the dragging of the composite window 114. In addition, the SFDC 402 can address the circumstances in which the developer fails to do this, and hence, the application component 106 that is produced, fails to forward specification information regarding the system-owned control feature 310. Upon detecting this failure, the SFDC 402 can define a default drag-capable zone within the title bar region (and/or anywhere else in the composite window 114). By virtue of this default action, the window presentation environment 102 can provide some mechanism by which a user can move the composite window 114.

As another design-related expectation, an application developer may be instructed to avoid drawing application content over the default-type system-owned control features 308. In addition, or alternatively, the SFDC 402 can ensure that application content will not intercept input events directed to the default-type system-owned features 308 by assigning a priority level to these features 308 that is higher than any other feature within the composite window 114 (although this ranking is not currently depicted in FIG. 5).

Finally, a routing component 410 directs input information (associated with a user's input action) to either a system component (e.g., the compositing component 122) or the application component 106, depending on the ownership of the feature that has been invoked. For example, when the user activates the application-owned control features 306, the input routing component 410 directs the input information to the application component 106. But when the user activates the system-owned control feature 310, the input routing component 410 directs the input information to the compositing component 122.

A.4. Placement Management Component

Figure 6:
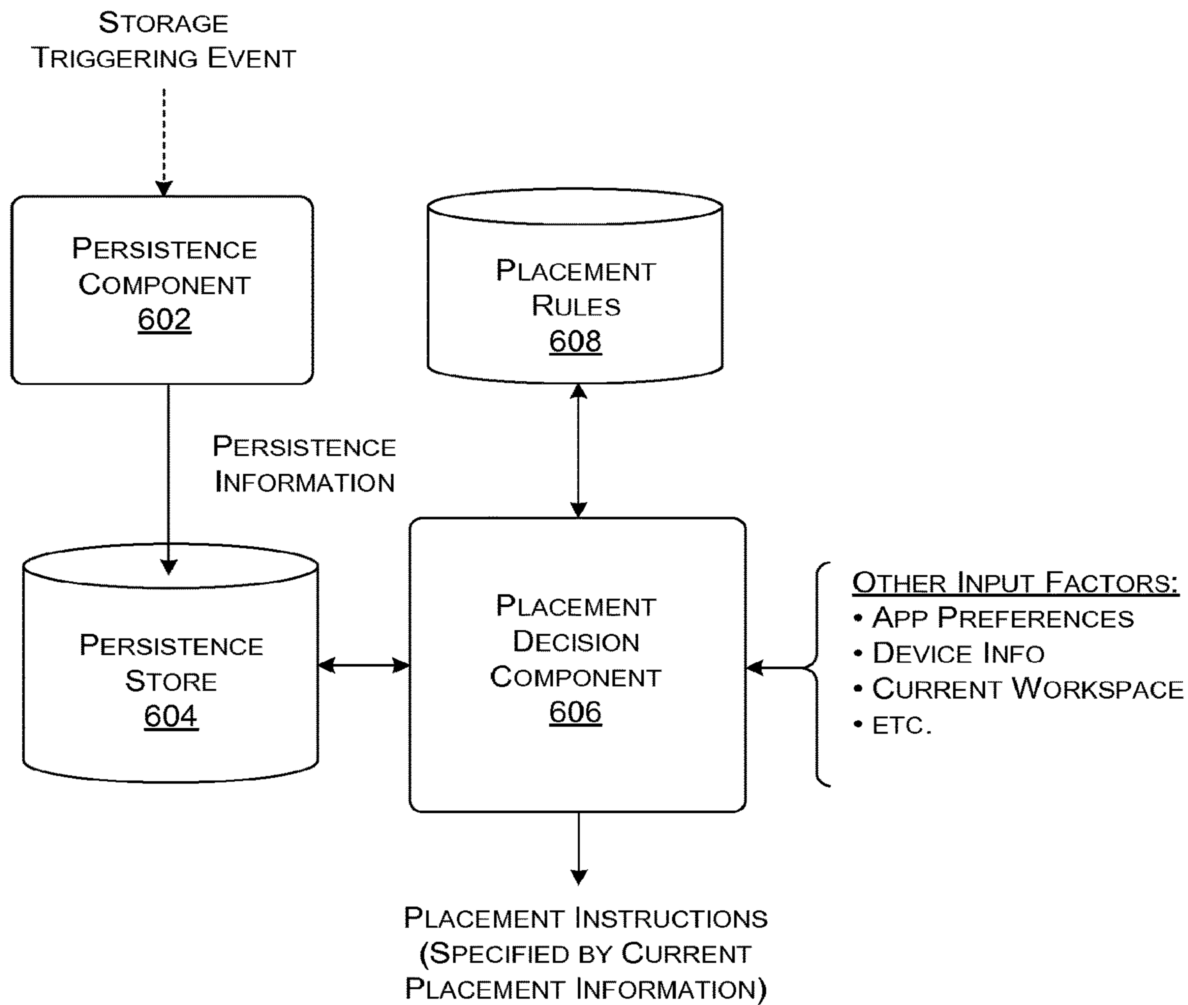
FIG. 6 shows one implementation a placement management component, which is another part of the window presentation environment of FIG. 1.

FIG. 6 shows one implementation of the placement management component 128 introduced in FIG. 1. The placement management component 128 determines the placement of the composite window 114 within the graphical user interface presentation 112 in various circumstances (described below). As described above, the placement information can describe any of the position of the composite window 114, the size of the composite window 114, and/or the state of the composite window 114 (corresponding to whether the composite window 114 is free-floating, snapped to one or more sides of the graphical user interface presentation 112, maximized, and so on).

The placement management component 128 includes a persistence component 602 for storing a last-registered placement of the composite window 114 in the graphical user interface presentation 112 in a data store 604, as expressed by persistence information (if, in fact, there was such a previous placement of the composite window 114). The persistence information can describe any aspect of the composite window's placement described above (e.g., its position, size, and/or state). Further, assume that the composite window 114 is currently snapped to one or more sides of the graphical user interface presentation 112, but that, prior to the snapped state, it existed as a free-floating window at a particular position and size within the graphical user interface presentation 112. The persistence component 602 can store persistence information that reflects that the composite window 114 is currently snapped to one or more sides of the graphical user interface presentation 112, as well as the position and size of the composite window 114 in its prior free-floating state.

The persistence component 602 can store the persistence information based on any triggering event(s). For example, the persistence component 602 can store the persistence information when the composite window 114 is suspended or terminated. In addition, the persistence component 602 may periodically store the persistence information during the user's interaction with the composite window 114.

A placement decision component 606 determines current placement information for the composite window 114 in different circumstances. In a first scenario, a user may have suspended or terminated the composite window 114, and then later seeks to resume interaction with the composite window 114. Here, the placement decision component 606 determines the placement of the reconstituted composite window 114 within the graphical user interface presentation 112. In a second scenario, a user manually moves the composite window 114, e.g., by dragging it within the graphical user interface presentation 112. Here, the placement decision component 606 regulates placement of the composite window 114 during the move. In one merely illustrative case, for example, the placement decision component 606 can prevent the user from resizing the composite window 114 below a prescribed minimum size permitted by the application component 106.

Generally, the placement decision component 606 can consider several factors in determining the current placement of the composite window 114, depending on the circumstance in which the placement decision is being made. As a first factor, the placement decision component 606 may take into account the persistence information provided in the data store 604 which defines the last placement of the composite window 114 in the graphical user interface presentation 112 (if any). As a second factor, the placement decision component 606 may consider the application preferences specified by the application component 106. As a third factor, the placement decision component 606 may consider the nature of the presentation device (or devices) on which the composite window 114 is to be displayed, such as the size (and resolution) of each such presentation device. As a fourth factor, the placement decision component 606 can take into account the workspace area that is currently available in the graphical user interface presentation 112 for use in displaying the composite window 114, and so on.

The placement decision component 606 can also rely on a data store 608 of environment-specific placement rules in making its placement decisions. One such general placement rule specifies that the composite window 114 should be reconstituted at the last-registered placement (as defined by the persistence information) whenever feasible. Assume, however, that the workspace area that is currently available to display the composite window 114 has decreased since the composite window 114 was last displayed, and that workspace area can no longer accommodate the display of the composite window 114 at its full prior size. One illustrative placement rule may instruct the placement decision component 606 to display the composite window 114 in a maximized state within the available workspace area.

Other placement rules specify that the composite window 114 should be displayed in a manner that reflects one or more application preferences specified by the application component 106. For example, the application component 106 can specify any of: a minimum size of the composite window 114, a maximum size of the composite window 114, one or more discrete permitted sizes of the composite window 114, one or more permitted presentation modes (e.g., orientations) of the composite window 114, and so on.

As noted above, the application component 106 can specify its preferences at any juncture, such as when the application component 106 first launches, or every time the application component 106 launches, etc. In addition, or alternatively, the windowing system 104 can specify default application preferences that it applies to all application components. Or the windowing system 104 can apply different sets of application preferences to different respective types of application components. In whatever manner these preferences are specified, the placement rules operate to enforce these various application preferences, e.g., by preventing the user from resizing the composite window 114 below its minimum size.

Other placement rules specify that the composite window 114 should be reduced in size by a prescribed amount in various circumstances. For example, one such placement rules can instruct the placement decision component 606 to reduce the size of composite window 114 to accommodate its presentation on a small-sized presentation device (defined as a presentation device having a size below a prescribed threshold).

In some cases, the application of one rule may conflict with the application of another rule. To address such a possibility, the placement decision component 606 can apply one or more meta-rules, each of which defines how to resolve such a conflict.

The above-described placement rules are cited by way of illustration, not limitation. Other implementations of the placement management component 128 can adopt a different set of rules to suit the environment to which it is applied.

A.5. Compositing Component

Figure 7:
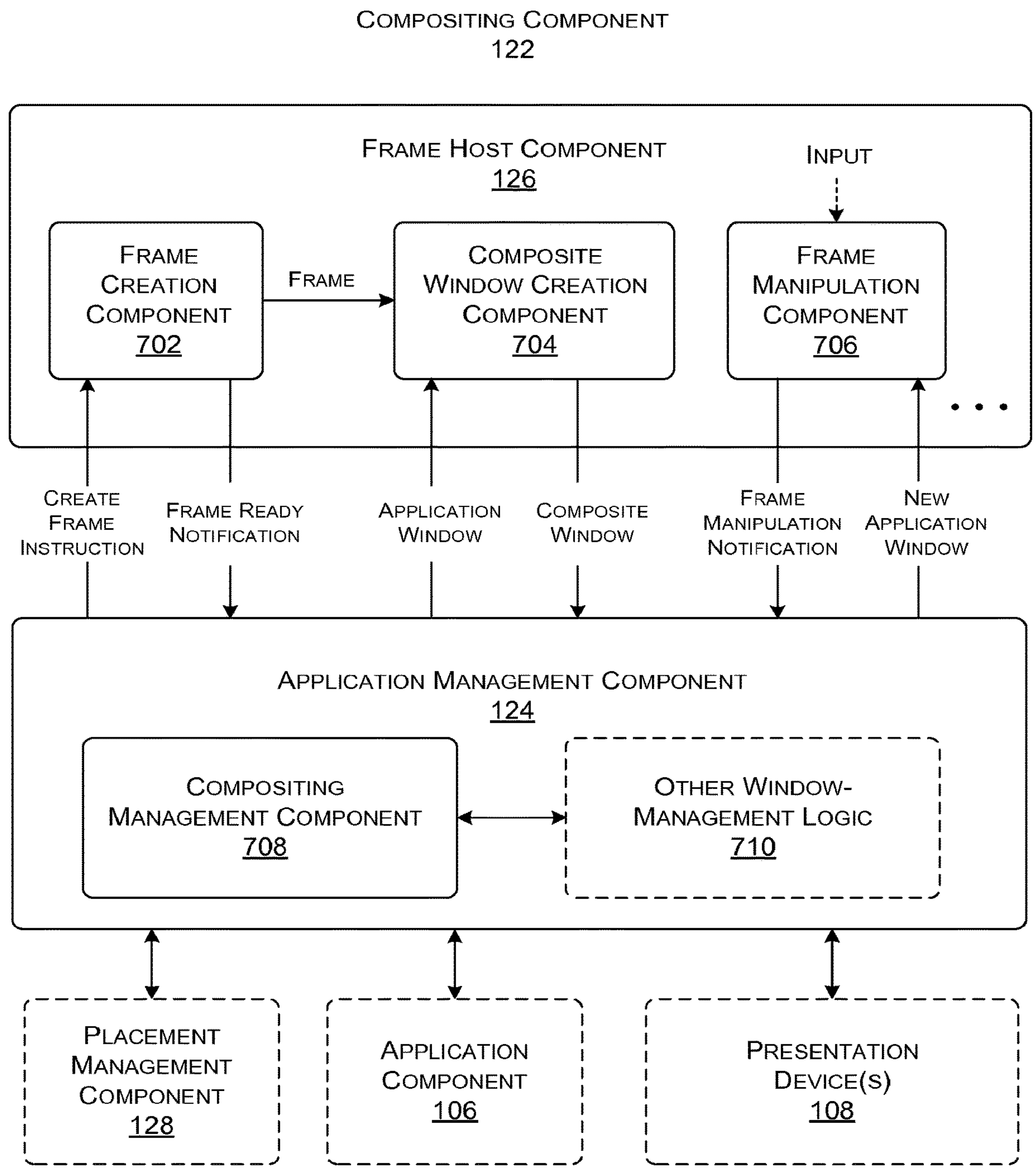
FIG. 7 shows one implementation of a compositing component, which is another part of the window presentation environment of FIG. 1.

FIG. 7 shows one implementation of the compositing component 122 introduced in FIG. 1. As noted above, in one implementation, the compositing component 122 includes a frame host component 126 together with an application management component 124. Other implementations can use other components to build the compositing component 122, or can allocate functions between the frame host component 126 and the application management component 124 in a different manner than is set forth below.

Generally, the frame host component 126 is responsible for generating the frame 118 and then processing input events (such as moving and resizing requests) that are directed to the frame 118. For instance, the frame host component 126 can include a frame creation component 702 for generating the frame 118, a composite window creation component 704 for generating the composite window 114, a frame manipulation component 706 for processing a user's manipulation of the composite window 114 (via the frame 118), a window suspension/resumption component (not shown) for receiving a request to suspend and later resume the application window 116 (via the frame 118), and so on.

The application management component 124 more generally manages the presentation of windows (including composite windows) on the graphical user interface presentation 112. For example, the application management component 124 may include a compositing management component 708 for specifically managing the creation, movement, suspension, etc. of composite-type windows described above. The application management component 124 can also include other window management logic 710 for handling other traditional window management tasks, such as by managing the presentation of overlapping windows, etc.

Assume that a triggering event occurs which prompts the windowing system 104 to create the composite window 114. In one case, the application management component 124 can interact with the application component 106 to receive the application window 116 therefrom. The application management component 124 also interacts with the placement management component 128 to determine an appropriate placement of the composite window 114, as defined by placement information. The application management component 124 also interacts with the frame creation component 702 to request that it generate the frame 118. The frame creation component 702 notifies the application management component 124 when the frame 118 is ready for use.

When the frame 118 is ready, the application management component 124 can request the composite window creation component 704 to generate the composite window 114. To do so, the application management component 124 can pass the composite window creation component 704 the application window 116 provided by the application component 106. In response, the composite window creation component 704 effectively "pastes" the application window 116 into the frame 118. The application management component 124 can then coordinate the presentation of the resultant composite window 114 on the graphical user interface presentation 112.

Next, assume that a triggering event occurs which indicates that a user (or some other entity) has moved the composite window 114 via an input event directed to its frame 118. The frame manipulation component 706 receives input information from the input component 130 regarding this input event. The frame manipulation component 706 thereafter notifies the application management component 124 of the request to move the composite window 114 to a new position (and/or a request to resize the composite window 114). The application management component 124 may thereafter interact with the application component 106 to receive a new application window (if appropriate), such as an application window that is resized to fit a new requested frame size. The application management component 124 thereafter interacts with the frame manipulation component 706 to generate and present a new composite window on the graphical user interface presentation 112.

Other illustrative behavior of the compositing component 122 is set forth in the next section.

In conclusion to Section A, the windowing system 104 provides a number of effects that may be beneficial in certain deployment scenarios. First, consider the case in which a user is familiar with a traditional windowing environment, but not so familiar with how to interact with the nonconforming application component 106. The windowing system 104 improves the efficiency by which a user interacts with the nonconforming application component 106 by allowing the user to interact with the application component 106 within a windowing environment, even though that is not the application component's native presentation environment. At the same time, the windowing system 104 respects application preferences associated with the nonconforming application component 106.

Second, the window presentation environment 102 can ensure the reliability and responsiveness of certain control operations by performing these operations in the windowing system 104, rather than the application component 106. Such an effect is based on the assumption that the windowing system 104 provides a more reliable and responsive control mechanism compared to any individual application component. For example, the window presentation environment 102 can allow the user to reliably manipulate the composite window 114 within the graphical user interface presentation 112 by handling these operations as system-level functions, rather than relying on the application component 106 to perform these tasks (because, for instance, the application component 106 may be subject to hangs and other performance-related problems).

Third, the window presentation environment 102 can also more effectively protect the security of certain operations by performing these operations in the windowing system 104, rather than the application component 106. For example, the purchase-related operation (e.g., associated with the control feature 312 of FIG. 3) may be less subject to attack by malicious application code because it is performed in the windowing system 104, and not in the application component 106.

Fourth, the windowing system 104 allows developers to create nonconforming application components that can be presented using many different presentation paradigms (e.g., windowed vs. non-windowed) and using different presentation devices (e.g., having different respective sizes), without creating custom application code for these different respective presentation paradigms and devices.

Fifth, the windowing system 104 efficiently conserves system resources through the manner in which it suspends composite windows. This last-mentioned effect is clarified in the next section, Section B.

B. Illustrative Processes

FIGS. 8-17 show processes and associated examples that explain the operation of the window presentation environment 102 of Section A in flowchart form. Since the principles underlying the operation of the window presentation environment 102 have already been described in Section A, certain operations will be addressed in summary fashion in this section. As noted in the prefatory part of the Detailed Description, the flowcharts are expressed as a series of operations performed in a particular order. But the order of these operations is merely representative, and can be varied in any manner.

B.1. Overview

Figure 8:
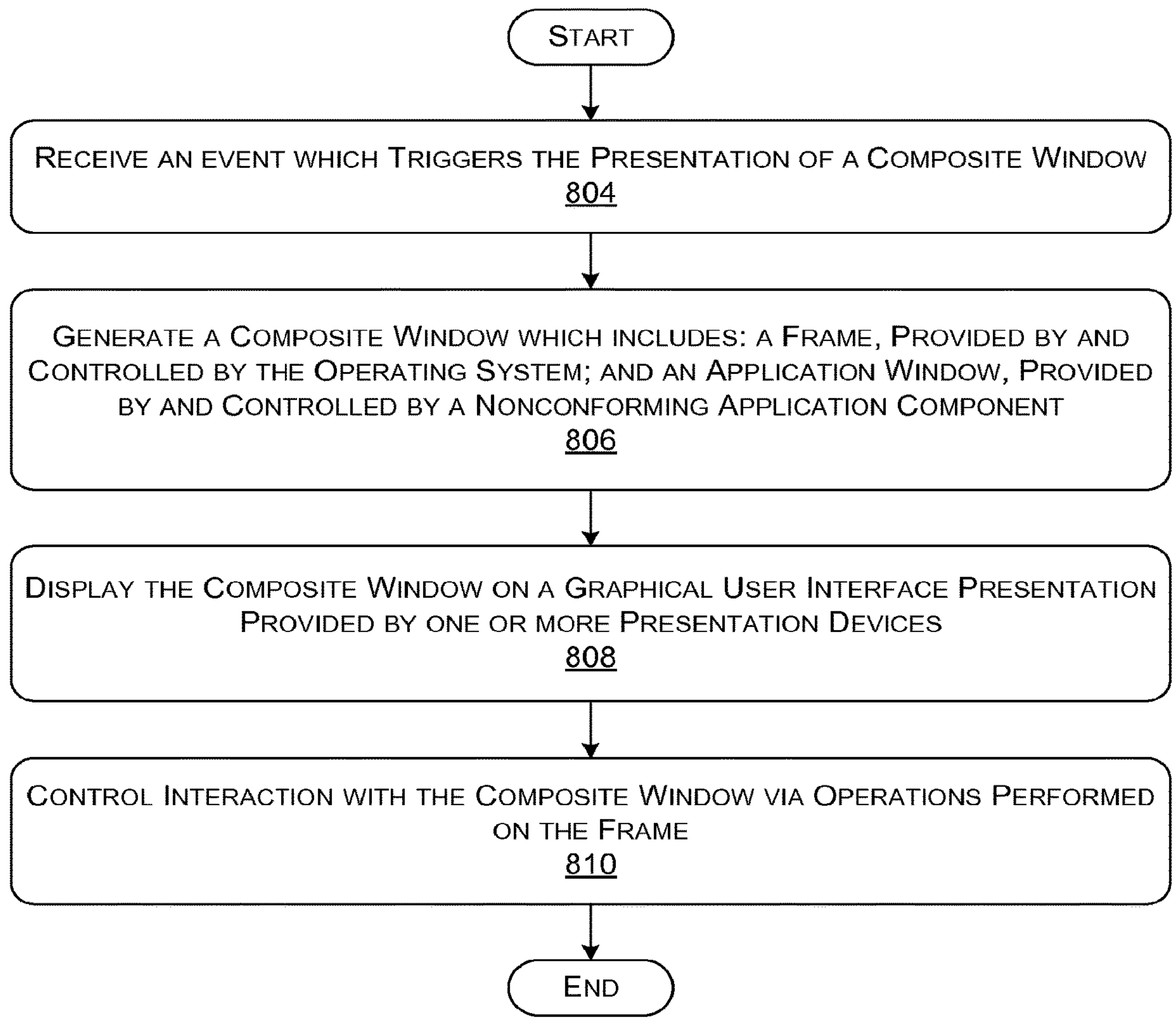
FIG. 8 shows a process that provides an overview of one manner of operation of the window presentation environment of FIG. 1.

FIG. 8 shows a process 802 that represents an overview of one manner of operation of the window presentation environment 102 of FIG. 1. In block 804, the compositing component 122 receives an event which triggers the presentation of the composite window 114. For example, the event may originate from a user's request to activate the application component 106. In block 806, the compositing component 122 generates the composite window 114. The composite window 114 includes the frame 118 and the application window 116. In block 808, the compositing component 122 displays the composite window 114 on the graphical user interface presentation 112 provided by one or more presentation devices 108. In block 810, the compositing component 122 can thereafter control the user's (and the operating system's) interaction with the composite window 114 via operations performed on the frame 118.

B.2. Creating a Composite Window

Figure 9:
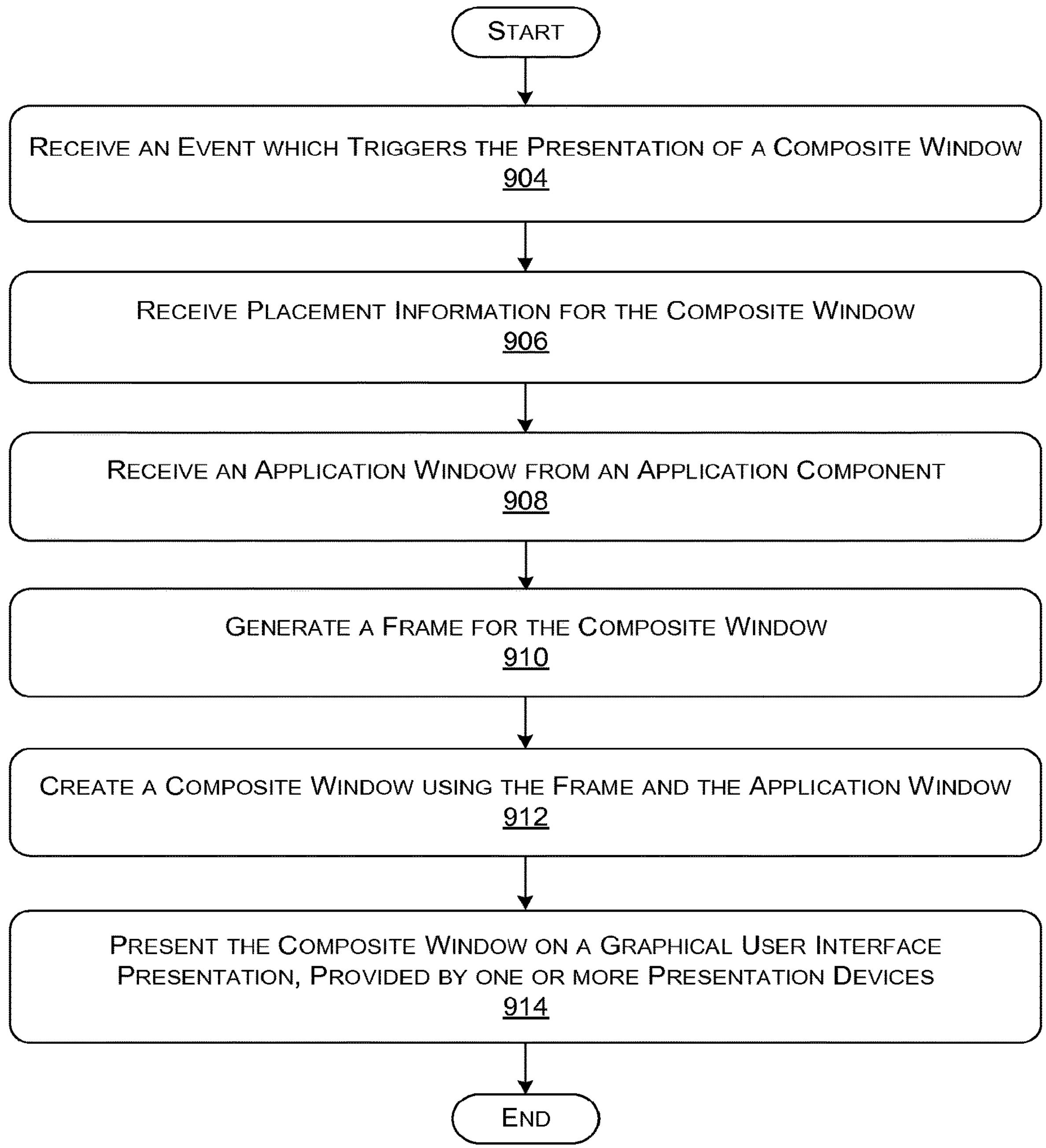
FIG. 9 shows a process that describes one manner by which the compositing component of FIG. 7 can create a composite window.

FIG. 9 shows a process 902 that describes—in greater detail compared to FIG. 8—one manner by which the compositing component 122 can create the composite window 114. In block 904, the compositing component 122 receives an event which triggers the presentation of the composite window 114. In block 906, the compositing component 122 receives (from the placement management component 128) placement information for the composite window 114, which defines the placement of the composite window 114 within the graphical user interface presentation 112. In block 908, the compositing component 122 receives (from the application component 106) the application window 116. In block 910, the compositing component 122 generates the frame 118. In block 912, the compositing component 122 generates the composite window 114 by effectively pasting the application window 116 into the frame 118. In one implementation, the frame host component 126 performs blocks 910 and 912. In block 914, the compositing component 122 presents the composite window 114 on the graphical user interface presentation 112. Note that FIG. 9 indicates that the application window 116 is created prior to the creation of the frame 118, but the order of these operations can be reversed, or both operations can be performed at the same time.

Figure 10:
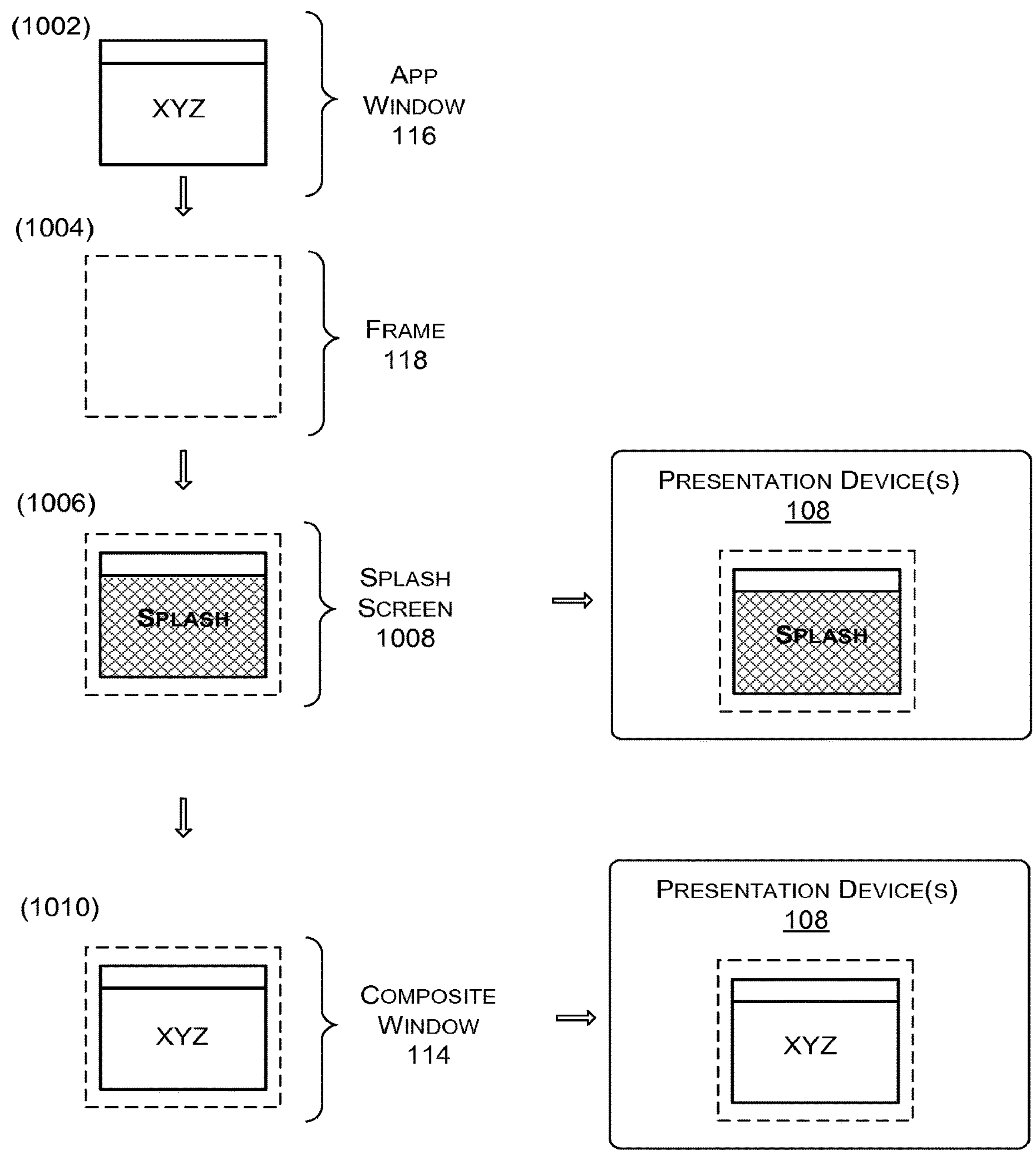
FIG. 10 shows an example of the operation of the process of FIG. 9.

FIG. 10 shows an example of the operation of the process 902 of FIG. 9. More specifically, the left-hand side of the figure shows objects generated by the compositing component 122, while the right-hand side of the figure shows content displayed by the compositing component 122 on the presentation device 108.

At juncture 1002, the compositing component 122 receives (from the application component 106) the application window. At juncture 1004, the compositing component 122 generates the frame. As noted above, however, the compositing component 122 can alternatively generate the frame 118 prior to the application window 116, or at the same time as the creation of the application window 116.

At juncture 1006, the compositing component 122 may optionally display an intermediary "splash" screen 1008 (within the frame 118) on the presentation device 108. The splash screen 1008 may contain a static snapshot associated with the application component 106. The compositing component 122 displays the splash screen 1008 until it is ready to display the final composite window 114. Doing so provides a satisfactory user experience, as the user is thereby immediately assured that the windowing system 104 has received a window-invocation request and is working on the request. Note that the splash screen 1008 does not yet give the user the opportunity to interact with the application content of the application component 106; but the user may manipulate the splash screen 1008 (via its frame 118) even at this preliminary juncture, e.g., by moving it, resizing it, etc. Finally, at juncture 1010, the compositing component 122 displays the final composite window 114.

B.3. Defining a System-Owned Feature

FIG. 11 shows a process 1102 that describes one manner by which the system feature definition component (SFDC) 402 of FIG. 4 can be used to set up a system-owned feature, such as the system-owned control feature 310 of FIG. 3 which defines a drag-capable region within the composite window 114. In block 1104, the SFDC 402 receives specification information from the application component 106, if that information is, in fact, provided. As described in Section A, the specification information can define various aspects of the system-owned feature, such as the spatial bounds of a zone associated with the system-owned feature. In block 1108, the SFDC 402 registers the system-owned feature in response to the specification information. In block 1110, the SFDC 402 may set up a default system-owned feature if the application component 106 fails to provide the specification information in block 1104. For instance, in the example of FIG. 3, if the application component 106 fails to explicitly define the drag-capable zone (associated with the system-owned control feature 310), then the SFDC 402 can define a default drag-capable zone somewhere within the title bar region of the composite window 114, or anywhere else. In other implementations, the SFDC 402 can define the default drag-capable zone regardless of whether or not the application component 106 explicitly defines another such zone.

B.4. Processing an Input Event

Figure 12:
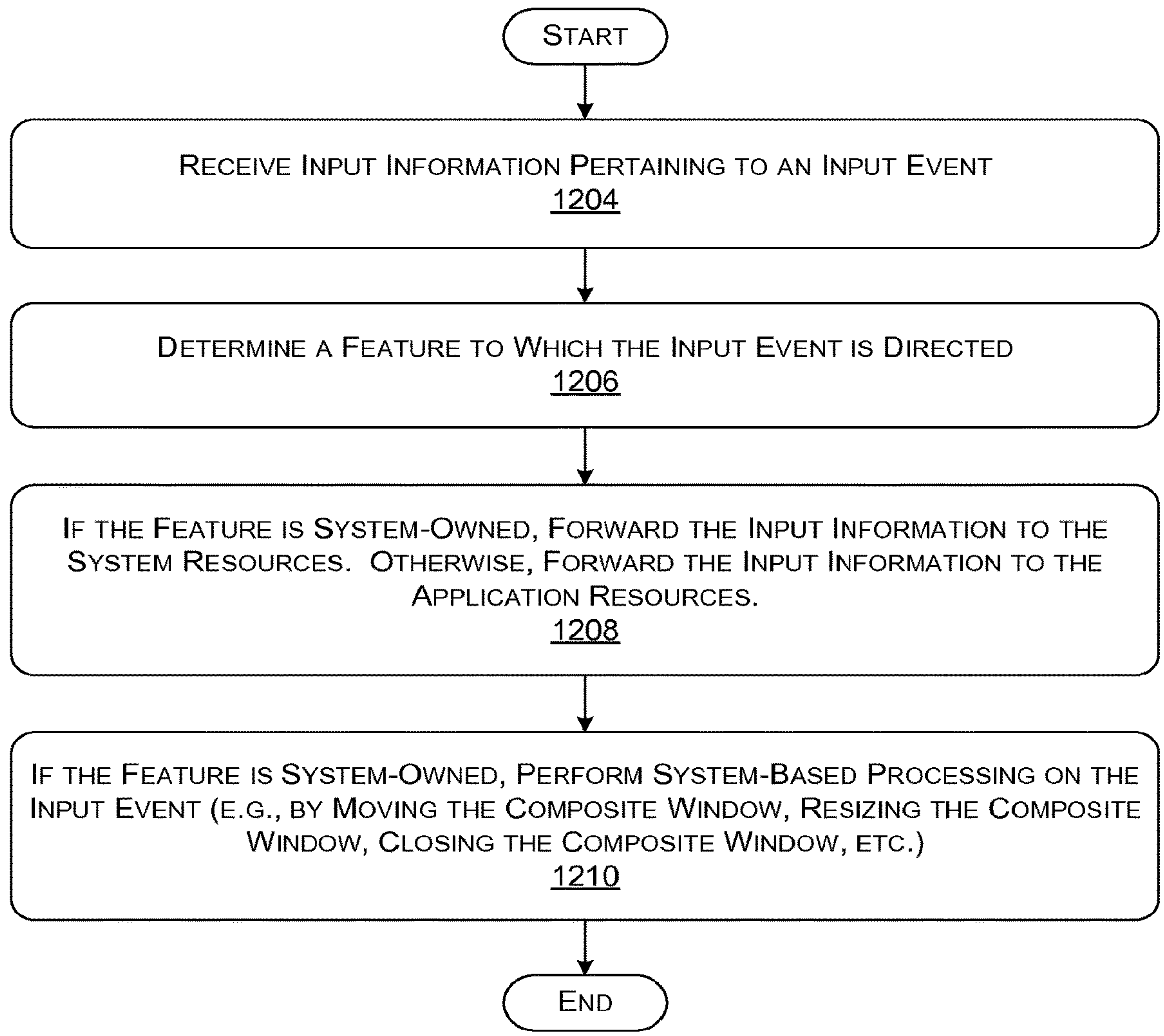
FIG. 12 shows a process that describes one manner by which the input component of FIG. 4 can process an input event.

FIG. 12 shows a process 1202 that describes one manner by which the input component 130 of FIG. 4 can process an input event. In block 1204, the input component 130 receives input information pertaining to the input event. The input event, in turn, may reflect an input action taken by a user, an action taken by another application component (besides the application component 106), or an action taken by the windowing system 104 itself. In block 1206, the input component 130 uses its hit-testing component 406 to determine a feature to which the input event is directed. In block 1208, if the feature is system-owned, the input component 130 forwards the input information to an appropriate component of the windowing system 104, such as the compositing component 122. Alternatively, in block 1210, if the feature is application-owned, the input component 130 forwards the input information to the application component 106.

B.5. Manipulating a Composite Window

Figure 13:
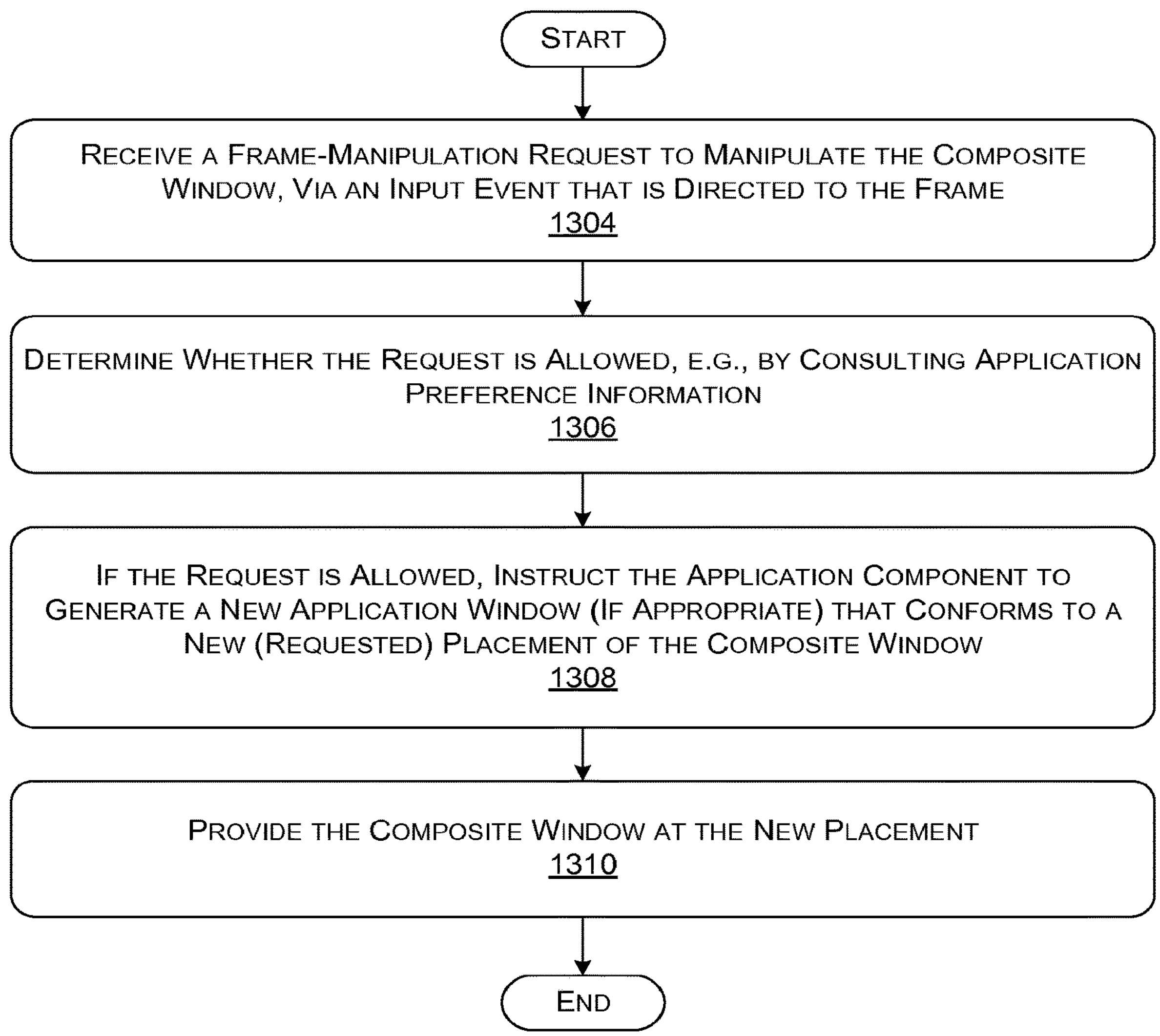
FIG. 13 shows a process that describes one manner by which the compositing component of FIG. 7 can manipulate a composite window.

FIG. 13 shows a process 1302 that describes one manner by which the compositing component 122 of FIG. 7 can manipulate the composite window 114, e.g., in response to an input action taken by the user with the intent of resizing or moving the composite window 114, etc. In block 1304, the compositing component 122 receives a frame-manipulation request to manipulate the composite window 114 via an input event that is directed to the composite window's frame 118. In block 1306, the compositing component 122 consults the placement management component 128 to determine whether the request is allowed. For example, the placement management component 128 may determine that the request is not allowed if the user is attempting to resize the composite window 114 below a minimum size specified by the application component 106. In block 1308, if the request is allowed, the compositing component 122 instructs the application component 106 to generate a new window (if this is appropriate, depending on the nature of the request that has been received). For example, if the user has made a request to modify the size of the composite window 114, then the compositing component 122 can ask the application component 106 to provide a new application window which conforms to the new size of the composite window 114. In block 1310, the compositing component 122 generates a new composite window and displays it on the graphical user interface presentation 112 at the new placement.

Figure 14:
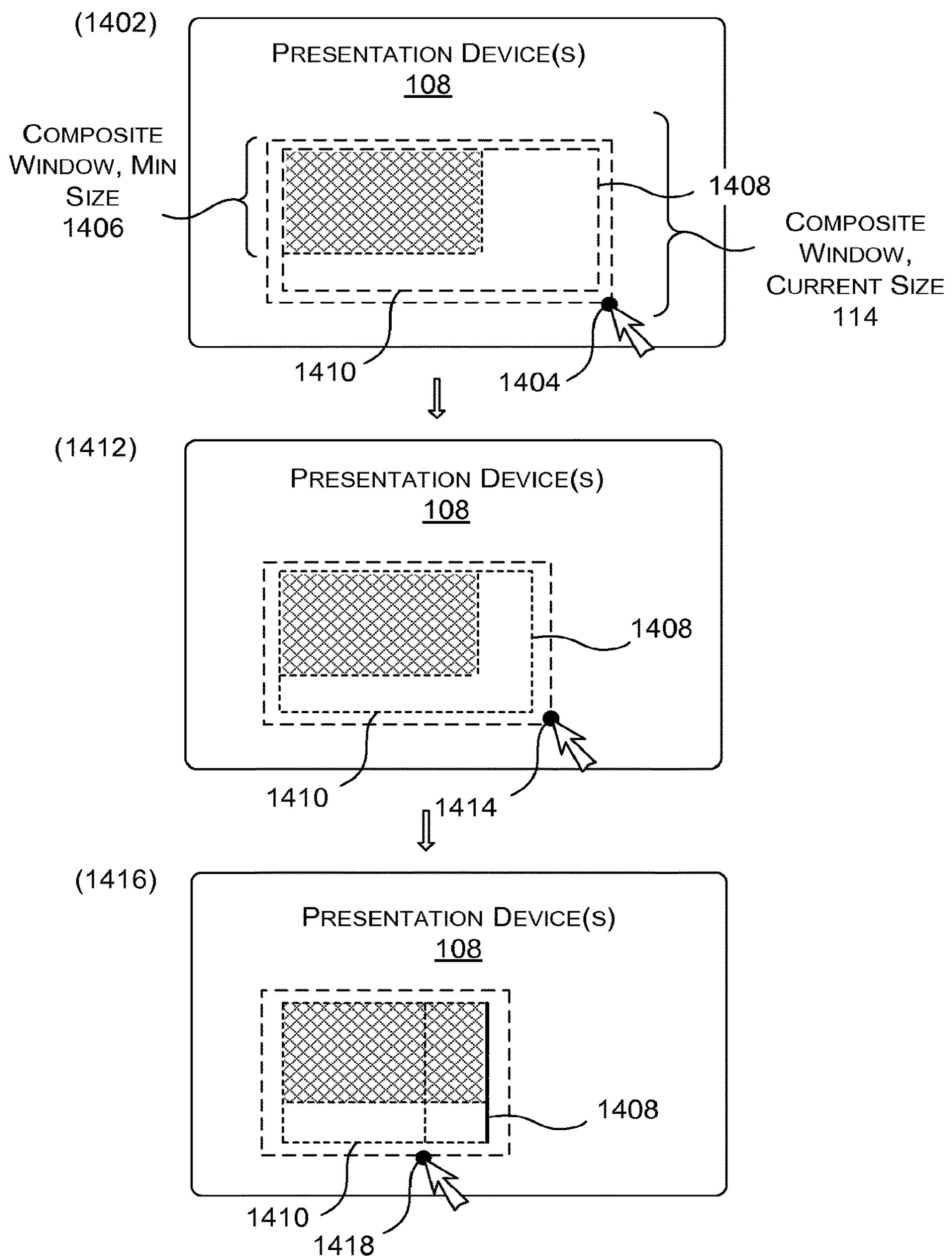
FIGS. 14 and 15 provide two respective examples of the operation of the process of FIG. 13, emphasizing the manner in which the compositing component (of FIG. 7) takes into account the application preferences of a nonconforming application component.
Figure 15:
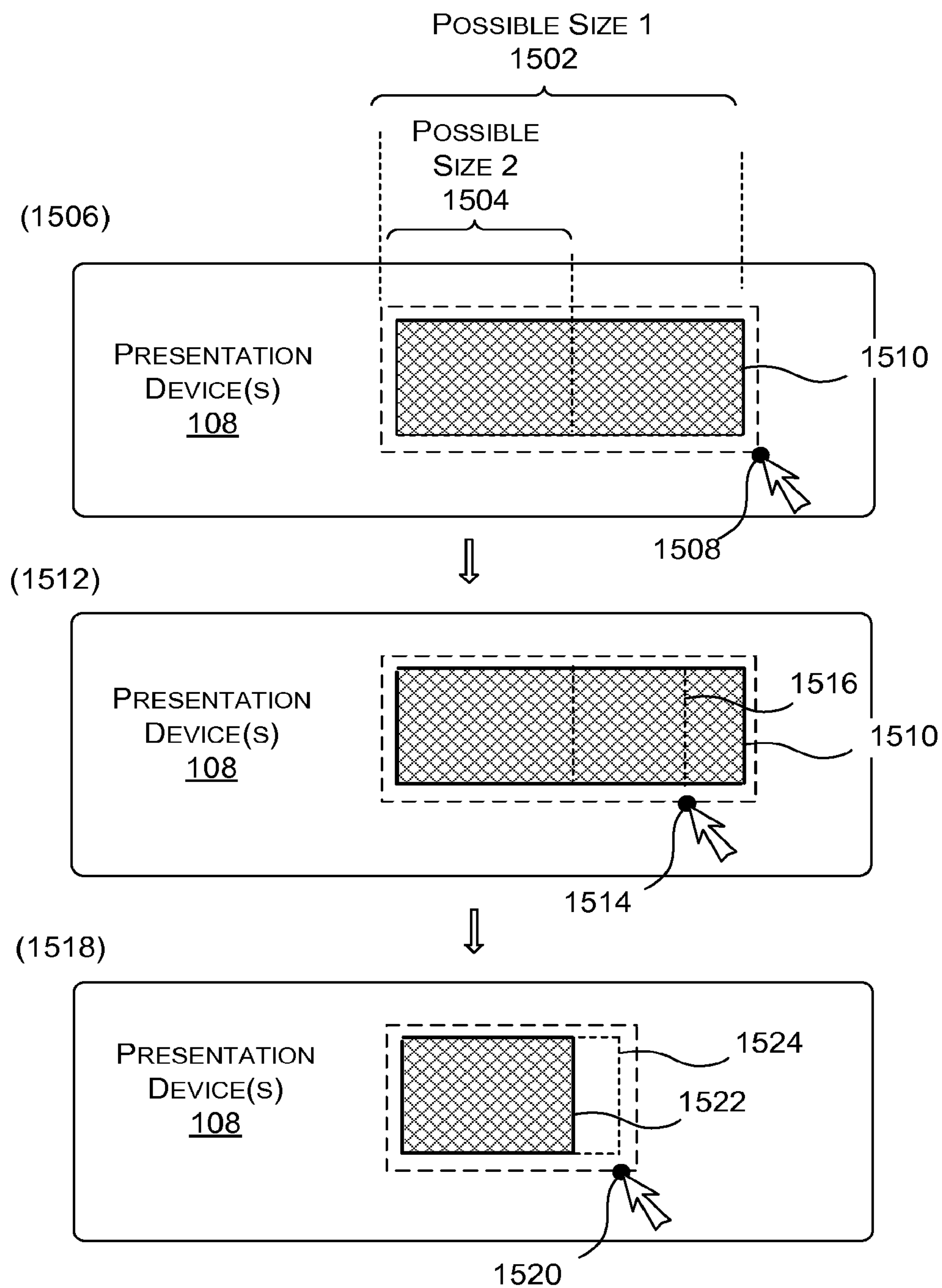

FIGS. 14 and 15 provide two respective examples of the operation of the process 1302 of FIG. 13, emphasizing the manner in which the compositing component 122 respects the application preferences of the application component 106.

Starting with FIG. 14, at juncture 1402, assume that the user commences a resizing operation by placing a mouse cursor at a position 1404, located at the corner of the composite window 114. The user then proceeds to drag the cursor to the left so as to reduce the size of the composite window 114. At this juncture, the composite window 114 has a first size. Further assume that the application component 106 specifies that the size of the composite window 114 cannot be reduced to a size that is smaller than a prescribed minimum-size composite window 1406. (Note that FIG. 14 visually depicts the boundary of the minimum-size composite window 1406 to facilitate explanation, although an actual implementation need not show this information.) The current size of the composite window 114 is greater than the minimum-size composite window 1406. To convey this state of affairs to the user, the compositing component 122 can display all borders (e.g., borders 1408, 1410, etc.) of the composite window 114 in dashed-line format (or using any other communicative visual attribute) to indicate that the composite widow 114 can be further resized in both its horizontal (width-related) and vertical (height-related) dimensions.

At juncture 1412, the user has moved the cursor to a position 1414. The compositing component 122 responds by decreasing the size of the composite window 114. The size of the composite window 114 is still greater than the minimum-size composite window 1406, so the compositing component 122 responds by continuing to display the borders (e.g., borders 1408, 1410, etc.) in dashed-line format, indicating that they remain adjustable.

At juncture 1416, the user has moved the cursor to a position 1418. Resizing the composite window 114 to the new position 1418 would violate the minimum size of the composite window 114. Hence, the compositing component 122 does not carry out the user's resizing request. The compositing component 122 can notify the user of the declined request in different ways, such as by declining to move the right-side border 1408 of the composite window 114 past the minimum width of the minimum-size composite window 1406. Further, the compositing component 122 can display the right-side border 1408 in a solid line (or using any other communicative visual attribute) to indicate that this border is no longer modifiable in the leftward direction (to make the window smaller). Nevertheless, the cursor position 1418 does not violate the minimum height of the minimum-size composite window 1406. Hence, the compositing component 122 can continue to display the horizontal border 1410 of the composite window 114 in a dashed-line format to indicate that is remains adjustable.

Although not explicitly conveyed in FIG. 14, note that the compositing component 122 performs the behavior shown in FIG. 14 by consulting the placement management component 128 in the course of the user's manipulation of the composite window 114. The placement management component 128, in turn, consults the application component's preferences to determine whether the manipulation being requested by the user is feasible. As another high-level point that is also not explicitly conveyed by FIG. 14, note that the compositing component 122 detects the operations performed by the user based on input events directed to the frame 118. Hence, the windowing system 104 is the primary agent which handles the manipulation requests, not the application component 106, although the application component 106 cooperates in the windowing system's processing of the manipulation requests.

FIG. 15 presents a scenario that is similar to that shown in FIG. 14. But in the case of FIG. 15, the composite window 114 has two permitted discrete sizes, correspond to large size 1 (1502) and smaller size 2 (1504), rather than a variable range of permitted sizes. At juncture 1506, the composite window 114 is presented in the larger size 1 (1502). Further, at this juncture 1506, the user has moved the cursor to a position 1508, corresponding to a corner of the composite window 114, with the intent of reducing the size of the composite window 114 by dragging the cursor to the left. At this juncture, a right-side border 1510 of the composite window 114 is displayed in a solid-line format to indicate that it is fixed.

At juncture 1512, the user has advanced the cursor to a position 1514. The position 1514 lies to right of a midway point between the smaller size 2 (1504) and the larger size 1 (1502). Because only two discrete sizes are permitted, and because the user has not yet passed the midway point, the compositing component 122 continues to display the composite window 114 in its full size. Further, the compositing component 122 can continue to display the right-hand border 1510 of the composite window 114 in a solid-line format. The compositing component 122 can optionally display a dashed vertical line 1516 to indicate the size of the window that has been requested by the user (based on the current position 1514 of the cursor), even though this request has not actually resulted in resizing the composite window 114.

At juncture 1518, the user has advanced the cursor to a position 1520. The position 1520 now lies to the left of the midway point between the smaller size 2 (1504) and the larger size 1 (1502). Upon passing the midway point (moving to the left), the compositing component 122 will snap the composite window 114 to the smaller size 2 (1504). Hence, at the present juncture 1518, the compositing component 122 displays the composite window 114 with a size that conforms to the smaller size 2 (1504), even though the position 1520 is still somewhat to the left of the right-side border of the smaller-sized composite window 114. The compositing component 122 can display the snapped right-side edge of the smaller-sized composite window 114 with a sold-line border 1522. The compositing component 122 can optionally display a vertical line 1524 in dashed-line format to coincide with the current position 1520 of the cursor.

Although not shown, assume that the user continues to move the cursor to the left, past the right-side edge of the smaller-sized composite window 114. The compositing component 122 can refuse to grant such as request, and will generally provide the behavior shown in FIG. 14 to convey this fact to the user.

Although not shown, the compositing component 122 can provide other presentation strategies to enforce other types of application preferences. For example, the compositing component 122 can prevent a user from achieving a prohibited display orientation (e.g., landscape or portrait) using similar strategies to those set forth above.

B.6. Suspending and Resuming a Composite Window

Figure 16:
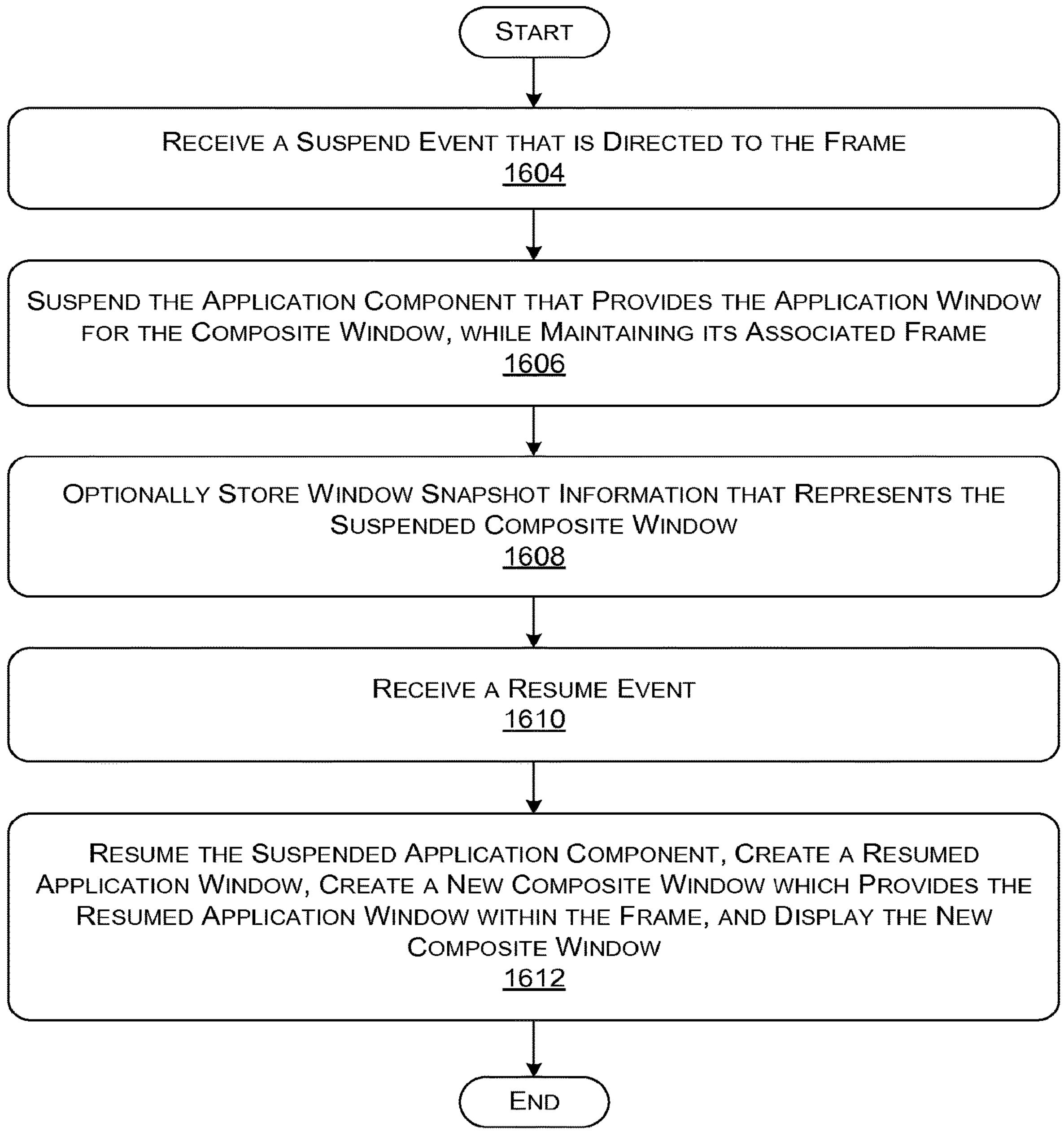
FIG. 16 shows a process that describes one manner by which the compositing component (of FIG. 7) can suspend and then resume a composite window.

FIG. 16 shows a process 1602 that describes one manner by which the compositing component 122 can suspend, and then resume, the composite window 114. In block 1604, the compositing component 122 receives an event (via the frame 118 of the composite window 114) that requests the suspension of the composite window 114. For example, a user may explicitly make a request to suspend the composite window 114 by minimizing the composite window 114. Or the windowing system 104 may make a request to suspend the compositing window 114 when the compositing window becomes fully occluded by another window. Or another application component (besides the application component 106) may make a request to suspend the composite window 114 for any environment-specific reason, and so on.

In block 1606, the compositing component 122 can suspend the composite window 114 by suspending the application window 116 of the composite window 114, but by maintaining the frame 118 associated with the composite window 114. In the suspended state, the application component 106 is not providing its services, and therefore does not consume the resources of the computing device on which it runs. The system resources include battery resources, processing resources, memory resources, etc. Moreover, the application component 106 is not awoken to handle system events (such as movement of the presentation device 108) because, from the perspective of the windowing system 104, the entity to process these kinds of events is the frame 118, which still exists, not the underlying application window 116.

In block 1610, the compositing component 122 receives a request to resume the suspended composite window 114. For example, a user may explicitly make this request by restoring the application component 106 from its minimized state. Or the windowing system 104 can make the request when the composite window 114 becomes non-occluded, and so on. In block 1612, the compositing component 122 responds to the request by: requesting and receiving a resumed application window from the application component 106; creating a new composite window by inserting the resumed application window into the existing frame 118; and displaying the new composite window. The process 1602 of FIG. 16 can be used to conserve system resources due to the fact that an application component that is suspended is not consuming system resources.

Figure 17:
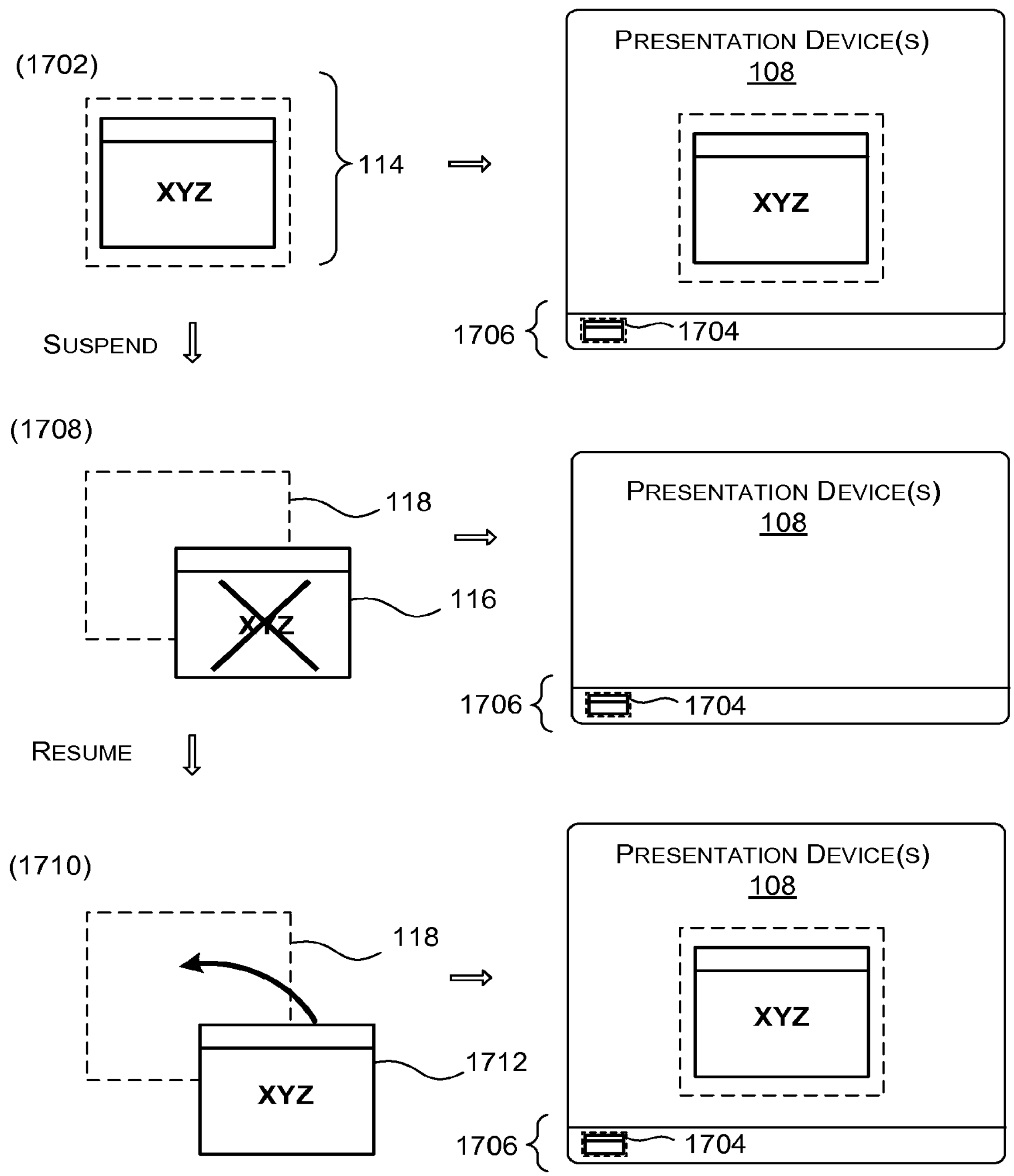
FIG. 17 shows an example of the operation of the process of FIG. 16.

FIG. 17 shows an example of the operation of the process 1602 of FIG. 16. At juncture 1702, the compositing component 122 displays the composite window 114 on the presentation device 108. The compositing component 122 can also display a representation 1704 of the composite window 114 in a taskbar region 1706 of the graphical user interface presentation 112. More generally, the compositing component 122 can display the representation 1704 via any mechanism(s) that the windowing system 104 uses to alert the user to the existence of suspended application components—the taskbar region 1706 being only one such mechanism.

At juncture 1708, a request is received to suspend the composite window 114. In response, the compositing component 122 suspends the application window 116, while maintaining the application frame 118 (but again note that the frame 118 itself is not displayed to the user). The compositing component 122 can also continue to display the representation 1704 of the suspended composite window 114 in the taskbar region 1706. For instance, the representation 1704 may provide a snapshot image of the application window 116, captured at the time of the window's suspension.

At juncture 1710, the compositing component 122 receives a request to resume the composite window 114. In response, it receives a resumed application window 1712 from the application component 106, inserts the resumed application window 1712 into the existing frame 118, and displays the resumed composition window 114. Between the request to suspend the composite window 114 and the request to resume the composite window 114, the application component 106 is not consuming any system resources.

C. Representative Computing Functionality

Figure 18:
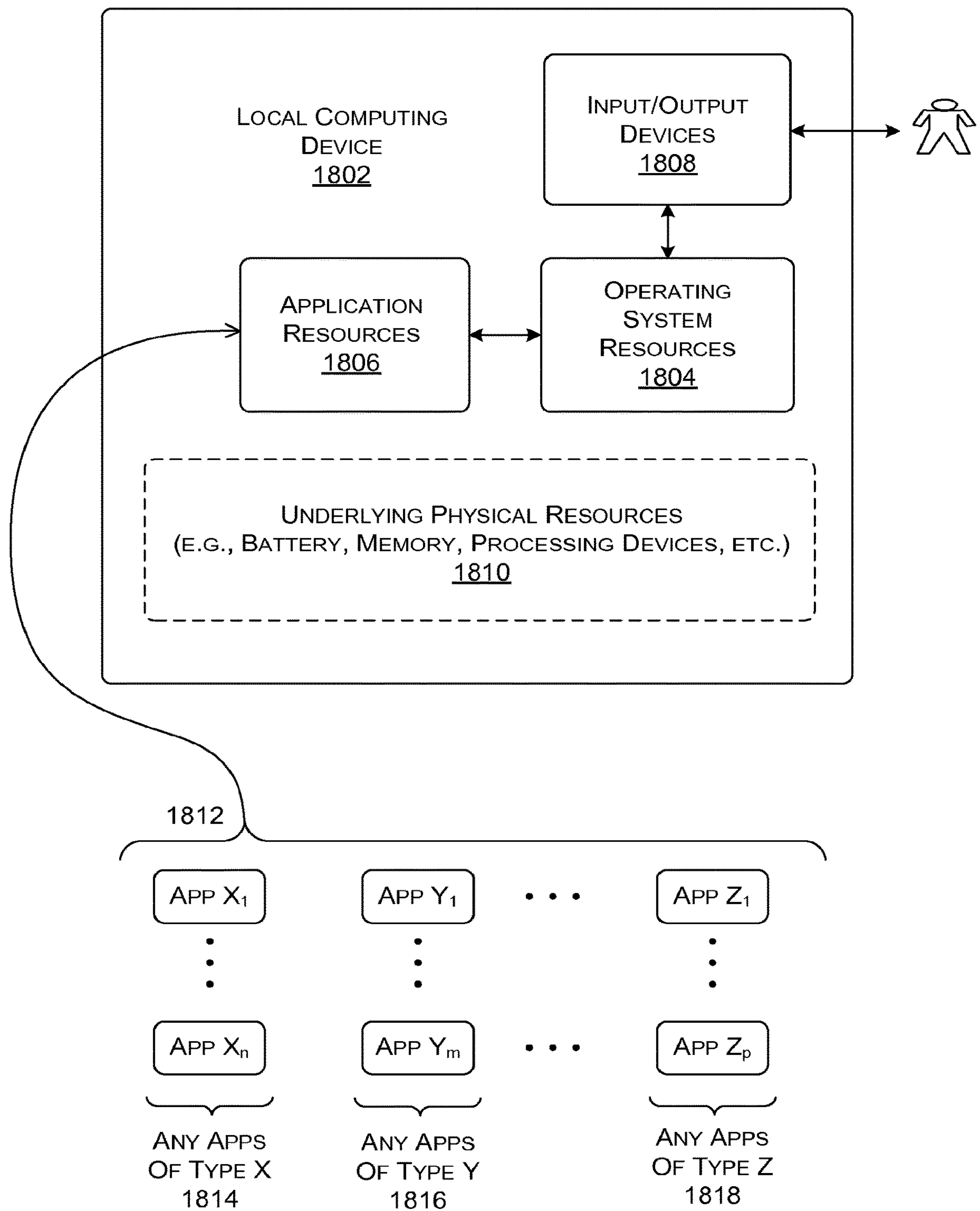
FIG. 18 shows one implementation of a computing device that can implement aspects of the window presentation environment of FIG. 1.

FIG. 18 shows one implementation of a standalone local computing device 1802 that can implement aspects of the window presentation environment 102 of FIG. 1. The computing device 1802 includes operating system resources 1804, application resources 1806, one or more input/output devices 1808 that enable a user to interact with the operating system resources 1804 and the application resources 1806, and underlying physical resources 1810, such as memory resources, processing resources, battery resources, and so on.

The application resources 1806 can include a set of one or more application components 1812. The set of application components 1812, in turn, can include subsets of application components (1814, 1816, . . . 1818) of different respective types. The subsets of application components (1814, 1816, . . . , 1818) may have been designed based on different respective native presentation paradigms. At least one subset of application components corresponds to nonconforming application components that were not originally designed for presentation in a windowing environment.

The local computing device 1802 can correspond to any type of computing mechanism, such as, without limitation, a desktop-type personal computing device, a game console device, a set-top box device, a laptop computing device, a tablet-type computing device, a smartphone, a wearable computing device, and so on.

Figure 19:
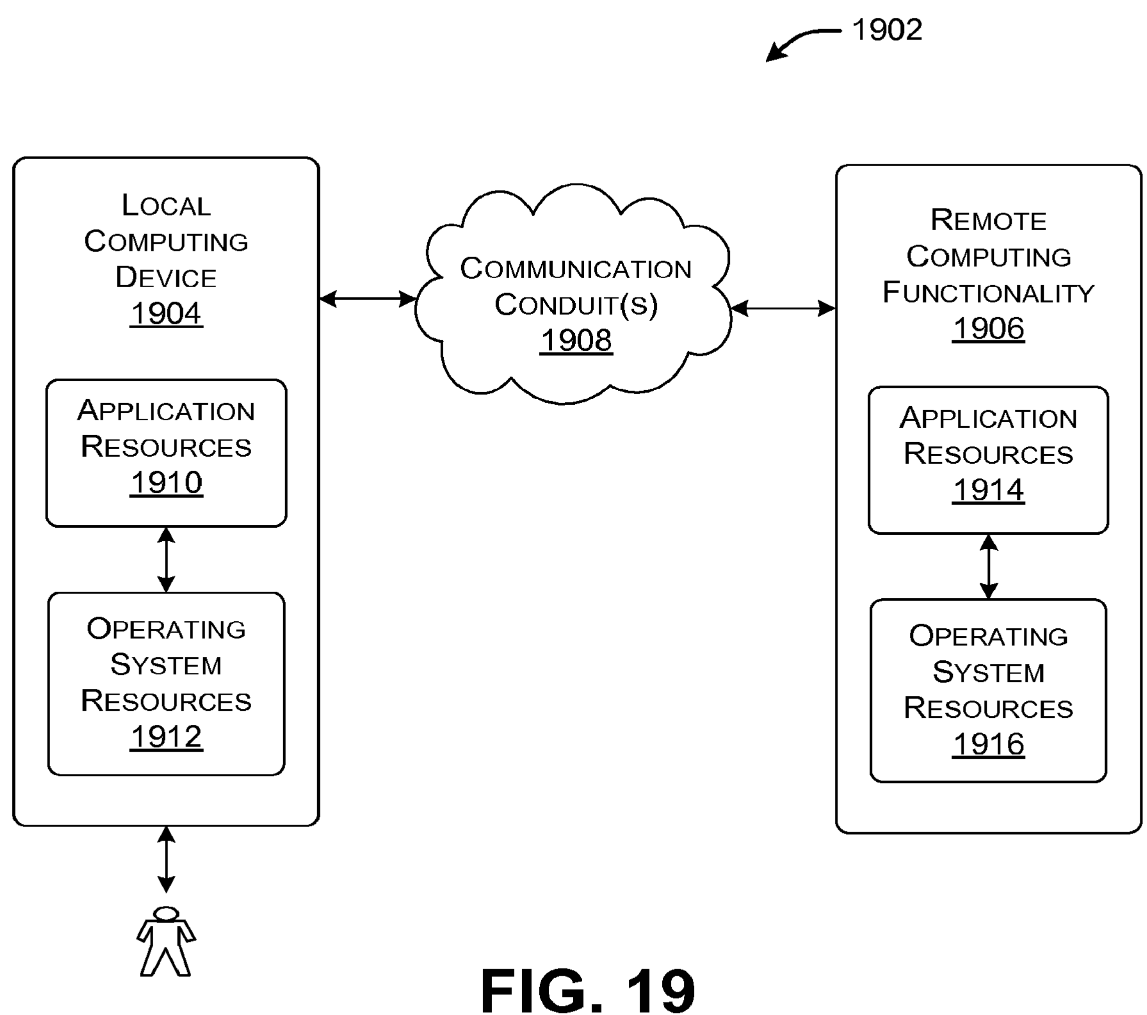
FIG. 19 shows one implementation of a computing system that can implement aspects of the window presentation environment of FIG. 1.

Alternatively, FIG. 19 shows a computing system 1902 that can implement aspects of the window presentation environment 102 of FIG. 1. The computing system 1902 includes at least one local computing device 1904 that is coupled to remote computing functionality 1906 via a communication conduit 1908. The local computing device 1904 may represent any type of computing device mentioned above with respect to FIG. 18. The remote computing functionality 1906 may correspond to one or more server computing devices and/or other computing equipment. The communication conduit 1908 may correspond to a local area network, a wide area network (e.g., the Internet), or any combination thereof.

The components of the window presentation environment 102 can be distributed between the local computing device 1904 and the remote computing functionality 1906 in any manner. As generically shown in FIG. 19, the local computing device 1904 can include local application resources 1910 and local operating system resources 1912, while the remote computing functionality 1906 can include remote application resources 1914 and remote operating system resources 1916. FIG. 19 omits the depiction of input/output devices and physical resources to simplify the drawing.

To cite merely one distributed processing scenario, the remote computing functionality 1906 can provide certain remote resources, such as a data store used by the placement management component 128 to store placement-related rules. The remote computing functionality 1906 can also provide a repository of application components for use by the local computing device 1904. The local computing device 1904 can implement all other aspects of the window presentation environment 102.

Figure 20:
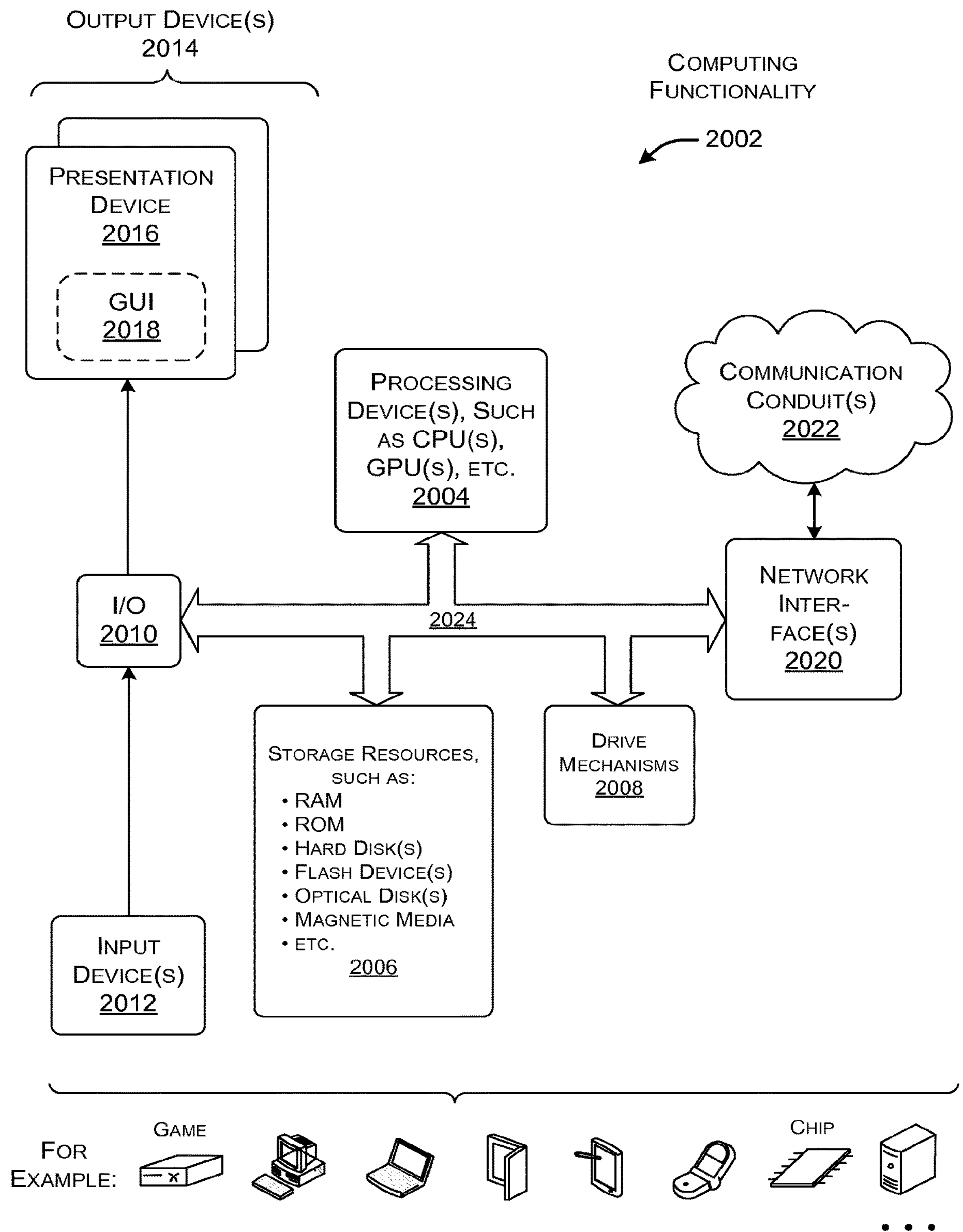
FIG. 20 shows illustrative computing functionality that can be used to implement any aspect of the features shown in the foregoing drawings.

FIG. 20 shows computing functionality 2002 that can be used to implement any aspect of the window presentation environment 102 set forth in the above-described figures. For instance, the type of computing functionality 902 shown in FIG. 20 can be used to implement any of the local computing devices (1802, 1904) of FIGS. 18 and 19, the remote computing functionality 1906 of FIG. 19, and so on. In all cases, the computing functionality 2002 represents one or more physical and tangible processing mechanisms.

The computing functionality 2002 can include one or more processing devices 2004, such as one or more central processing units (CPUs), and/or one or more graphical processing units (GPUs), and so on. The computing functionality 2002 can also include any storage resources 2006 for storing any kind of information, such as code, settings, data, etc. Without limitation, for instance, the storage resources 2006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 2002. The computing functionality 2002 may perform any of the functions described above when the processing devices 2004 carry out instructions stored in any storage resource or combination of storage resources. The computing functionality 2002 also includes one or more drive mechanisms 2008 for interacting with any storage resource, such as a hard disk drive mechanism, an optical disk drive mechanism, and so on.

The computing functionality 2002 also includes an input/output module 2010 for receiving various inputs (via input devices 2012), and for providing various outputs (via output devices 2014). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 2016 and an associated graphical user interface presentation (GUI) 2018. The presentation device 2016 may correspond to a physical monitor (e.g., a charge-coupled display device, a cathode ray tube device, a projection mechanism, etc.). Other output devices include a printer, a model-generating mechanism, a tactile output mechanism, an archival mechanism (for storing output information), and so on. The computing functionality 2002 can also include one or more network interfaces 2020 for exchanging data with other devices via one or more communication conduits 2022. One or more communication buses 2024 communicatively couple the above-described components together.

The communication conduit(s) 2022 can be implemented in any manner, e.g., by a local area network, a wide area network (e.g., the Internet), point-to-point connections, etc., or any combination thereof. The communication conduit(s) 2022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2002 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

The following summary provides a non-exhaustive list of illustrative aspects of the technology set forth herein.

According to a first aspect, one or more computing devices are described for interacting with a nonconforming application component in a windowing environment. The computing device(s) include a compositing component, provided by an operating system of the computing device(s). The compositing component is configured to: receive an event which triggers presentation of a composite window; receive placement information for the composite window; and receive an application window from a nonconforming application component. The nonconforming application component corresponds to a type of application that was not originally designed for presentation of application content in a windowing environment, or was not originally designed for presentation of application content in a windowing environment of a prescribed type. Further, the application window represents an application resource that is controlled by the nonconforming application component. The compositing component is further configured to: generate a frame for the composite window, the frame representing a system resource that is controlled by the operating system; create the composite window by combining the frame and the application window; and present the composite window on a graphical user interface presentation, provided by one or more presentation devices, as governed by the placement information. The compositing component is further configured to control the composite window via operations performed on the frame of the composite window.

According to a second aspect, the nonconforming application component corresponds to an immersive-type full-screen application that was originally designed to present application content that fills an entire space defined by the graphical user interface presentation.

According to a third aspect, the computing device(s) further include a placement management component that provides the placement information, where the placement information defines a placement of the composite window within the graphical user interface presentation. The placement management component is configured to generate the placement information based on at least: persistence information that defines a last placement of the composite window in the graphical user interface presentation, if any; and at least one application preference defined by the nonconforming application component.

According to a fourth aspect, the above-mentioned at least one application preference defined by the nonconforming application component specifies one or more of: a maximum size of the application window; and/or a minimum size of the application window; and/or; one or more discrete permitted sizes of the application window; and/or one or more permitted presentation modes of the application window.

According to a fifth aspect, the computing device(s) further include a system feature definition component (SFDC) that is configured to: receive specification information from the nonconforming application component that specifies a domain within the composite window that is to be associated with a system-owned feature, if, in fact, the specification information is provided by the nonconforming application component; and register the system-owned feature in response to the specification information.

According to a sixth aspect, the SFDC is further configured to define a default system-owned feature if the nonconforming application component fails to provide the specification information.

According to a seventh aspect, the above-mentioned system-owned feature provides a mechanism by which a user can manipulate the composite window.

According to an eighth aspect, the system-owned feature provides a security-related mechanism, and wherein interaction by a user with the security-related mechanism does not entail interaction with the nonconforming application component.

According to a ninth aspect, the computing device(s) further include an input component that is configured to: receive input information pertaining to an input event; determine a feature of the composite window to which the input event is directed; if the feature to which the input event is directed is system-owned, forward the input information to the operating system, and perform system-based processing of the input information within the operating system; and if the feature to which the input event is directed is application-owned, forward the input information to the nonconforming application component.

According to a tenth aspect, the system-owned feature corresponds to a feature that is defined, in advance of receipt of the input information, by specification information provided by the nonconforming application component.

According to an eleventh aspect, the system-owned feature corresponds to a drag-capable region, and wherein the system-based processing entails moving the composite window in response to interaction by a user with the drag-capable region.

According to a twelfth aspect, the compositing component includes a frame host component that governs creation of the frame and which governs control of the frame via operations performed on the frame.

According to a thirteenth aspect, the compositing component further includes an application manager component for managing the composite window by interacting with the frame host component and the nonconforming application component.

According to a fourteenth aspect, the compositing component is configured to manipulate the composite window, via the frame, by: receiving, by the frame host component, a frame-manipulation request to manipulate the composite window, via an input event that is directed to the frame, the request, if allowed, having an effect of moving the composite window from a current placement to a new placement; determining whether the request is allowed; and when the request is allowed, providing the composite window at the new placement.

According to a fifteenth aspect, the above-recited operation of determining whether the request is allowed entails determining whether at least one application preference specified by the nonconforming application component is satisfied.

According to a sixteenth aspect, the compositing component is configured to suspend and resume the composite window, via operations performed on the frame, by: receiving, by the frame host component, a suspend instruction that is directed to the frame; suspending the nonconforming application in response to the suspend instruction, while maintaining the frame of the composite window, thereby conserving resources associated with the computing device(s); receiving a resume instruction; resuming the nonconforming application component that has been suspended in response to the resume instruction; creating a resumed application window; creating a new composite window which provides the resumed application window within the frame; and displaying the new composite window.

According to a seventeenth aspect, a method is described, performed by one or more computing devices, for interacting with a nonconforming application component in a windowing environment. The method includes the operations of: receiving an event which triggers presentation of a composite window; and generating the composite window. The composite window includes: a frame, provided by and controlled by an operating system of the computing device(s); and an application window, provided by and controlled by a nonconforming application component, the nonconforming application component corresponding to a type of application that was not originally designed for presentation of applicant content in a windowing environment, or was not originally designed for presentation of application content in a windowing environment of a prescribed type. The method further includes: displaying the composite window in a graphical user interface presentation provided by one or more presentation devices; and controlling interaction with the composite window via operations performed on the frame of the composite window.

According to an eighteenth aspect, the above-recited operation of controlling interaction encompasses manipulating the size and/or position of the composite window, suspending the composite window, and terminating the composite window.

According to a nineteenth aspect, the above-recited operation of generating the composite window involves ensuring that at least one application preference associated with the nonconforming application component is satisfied.

According to a twentieth aspect, a computer readable storage medium is described for storing computer readable instructions, wherein the computer readable instructions implement a compositing component when executed by one or more processing devices. The computer readable instructions include: logic configured to receive an event which triggers presentation of a composite window; logic configured to receive placement information for the composite window, the placement information specifying a placement of the composite window within a graphical user interface presentation, the placement, in turn, satisfying at least one application preference specified by a nonconforming application component; and logic configured to receive an application window from the nonconforming application component. The nonconforming application component corresponds to a type of application that was not originally designed for presentation of applicant content in a windowing environment, or was not originally designed for presentation of application content in a windowing environment of a prescribed type. Further, the application window represents an application resource that is controlled by the nonconforming application component. The computer readable instructions further include: logic configured to generate a frame for the composite window, the frame representing a system resource that is controlled by an operating system; logic configured to create the composite window by combining the frame and the application window; and logic configured to present the composite window on a graphical user interface presentation.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer readable storage medium counterpart, data structure counterpart, article of manufacture counterpart, graphical user interface presentation counterpart, etc. associated with the first through twenty-first aspects.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:

a processing device; and a storage resource storing instructions which, when executed by the processing device, cause the processing device to implement an operating system configured to:

provide a windowing environment for presentation of application content provided by a plurality of applications;

obtain selected application content from a selected immersive application adapted for an immersive processing environment;

display the selected application content in a window on the computing device concurrently with a region having a plurality of control features, the plurality of control features in the region including an application-owned control feature owned by the selected immersive application and an operating system-owned control feature owned by the operating system;

for first input events that are directed to the application-owned control feature, route corresponding first input information to the selected immersive application; and for second input events that are directed to the operating system-owned control feature, process corresponding second input information using the operating system.

2. The computing device of claim 1, wherein the region in which the application-owned control feature and the operating system-owned control feature are displayed comprises a horizontal bar.

3. The computing device of claim 2, wherein the application-owned control feature and the operating system-owned control feature are adjacent to one another in the horizontal bar.

4. The computing device of claim 3, wherein the first input information invokes one or more application-specific functions by the selected immersive application when the application-owned control feature is selected from the horizontal bar.

5. The computing device of claim 4, wherein the operating system is further configured to:

perform respective hit-tests on a plurality of input events to identify the first input events as being directed to the application-owned control feature in the horizontal bar and the second input events as being directed to the operating system-owned control feature in the horizontal bar.

6. The computing device of claim 5, wherein the operating system is further configured to:

in at least some instances, display the horizontal bar having the application-owned control feature and the operating system-owned control feature vertically above the window in which the selected application content is displayed.

7. The computing device of claim 6, the operating system configured to receive the plurality of input events from a mouse.

8. The computing device of claim 6, the operating system configured to receive the plurality of input events via a touch-sensitive input mechanism.

9. A method performed by an operating system of a computing device, the method comprising:

providing a windowing environment for presentation of application content provided by a plurality of applications;

obtaining selected application content from a selected application adapted for a processing environment other than the windowing environment provided by the operating system;

displaying the selected application content in a window concurrently with a region having a plurality of control features, the plurality of control features in the region including an application-owned control feature owned by the selected application and an operating system-owned control feature owned by the operating system;

for first input events that are directed to the application-owned control feature, routing corresponding first input information to the selected application; and for second input events that are directed to the operating system-owned control feature, processing corresponding second input information using the operating system.

10. The method of claim 9, further comprising:

displaying the region as a horizontal bar; and populating the horizontal bar with the application-owned control feature and the operating system-owned control feature.

11. The method of claim 10, wherein the application-owned control feature and the operating system-owned control feature are adjacent to one another in the horizontal bar.

12. The method of claim 9, wherein routing the first input information to the selected application causes the selected application to invoke an application-specific function that changes the selected application content displayed in the window in response to the first input events.

13. The method of claim 9, further comprising:

performing respective hit-tests on a plurality of input events to identify the first input events as being directed to the application-owned control feature in the region and the second input events as being directed to the operating system-owned control feature in the region.

14. The method of claim 13, further comprising:

in at least some instances, displaying the region having the application-owned control feature and the operating system-owned control feature vertically above the window in which the selected application content is displayed.

15. The method of claim 14, further comprising:

receiving the plurality of input events from a mouse.

16. The method of claim 14, further comprising:

receiving the plurality of input events from a touch-sensitive input mechanism.

17. The method of claim 9, the selected application comprising an immersive application.

18. The method of claim 17, wherein the immersive application is configured to present full-screen application content when executed in the processing environment other than the windowing environment provided by the operating system.

19. A computer readable storage medium storing computer readable instructions which, when executed by one or more processing devices, cause the one or more processing devices to perform acts comprising:

receiving selected application content from a selected application adapted for a processing environment other than a windowing environment in which the selected application content is received;

causing the selected application content to be displayed, in the windowing environment, in a window concurrently with a region having a plurality of control features, the plurality of control features in the region including an application-owned control feature owned by the selected application and an operating system-owned control feature owned by an operating system that provides the windowing environment;

for first input events that are directed to the application-owned control feature, routing corresponding first input information to the selected application; and for second input events that are directed to the operating system-owned control feature, providing corresponding second input information for processing by the operating system.

20. The computer readable storage medium of claim 19, the acts performed by the operating system.

* * * * *